(12) United States Patent
Puri et al.

(10) Patent No.: US 10,043,006 B2
(45) Date of Patent: Aug. 7, 2018

(54) EVENT ANOMALY ANALYSIS AND PREDICTION

(71) Applicant: Accenture Global Services Limited, Dublin (IE)

(72) Inventors: Colin Anil Puri, San Jose, CA (US); Patrick Joyce, Wilmington, MA (US); Brandon Eugene Humpert, San Jose, CA (US); Stephen David Johnson, Brooklyn, NY (US); Jonte Demetrio Craighead, San Francisco, CA (US)

(73) Assignee: ACCENTURE GLOBAL SERVICES LIMITED, Dublin (IE)

( * ) Notice: Subject to any disclaimer, the term of this patent is extended or adjusted under 35 U.S.C. 154(b) by 220 days.

(21) Appl. No.: 15/184,607

(22) Filed: Jun. 16, 2016

(65) Prior Publication Data

US 2016/0371489 A1    Dec. 22, 2016

Related U.S. Application Data

(60) Provisional application No. 62/181,150, filed on Jun. 17, 2015.

(51) Int. Cl.
```
G06F 21/55    (2013.01)
G06F 17/30    (2006.01)
G06N 99/00    (2010.01)
H04L 29/06    (2006.01)
```

(52) U.S. Cl.
CPC ...... *G06F 21/554* (2013.01); *G06F 17/30563* (2013.01); *G06F 21/552* (2013.01); *G06N 99/005* (2013.01); *H04L 63/1425* (2013.01); *G06F 2221/034* (2013.01)

(58) Field of Classification Search
CPC ... H04L 63/1425; G06F 21/55; G06F 21/552; G06F 21/554; G06F 2221/034
See application file for complete search history.

(56) References Cited

U.S. PATENT DOCUMENTS

| 7,735,141 | B1* | 6/2010 | Noel | H04L 63/1425 709/223 |
| 9,112,895 | B1* | 8/2015 | Lin | H04L 63/1416 |
| 2002/0082886 | A1* | 6/2002 | Manganaris | G06F 21/552 719/318 |
| 2005/0203927 | A1 | 9/2005 | Sull et al. | |
| 2007/0226796 | A1* | 9/2007 | Gilbert | G06F 21/55 726/22 |

(Continued)

FOREIGN PATENT DOCUMENTS

WO    2014/171926    10/2014

*Primary Examiner* — Khang Do
(74) *Attorney, Agent, or Firm* — Mannava & Kang, P.C.

(57) ABSTRACT

According to an example, event anomaly analysis and prediction may include accessing a master directed graph that specifies known events and transitions between the known events, and ranking each of the known events. Each of the ranked known events may be clustered into a plurality of anomaly categories. A plurality of rules to analyze new events may be determined based on the plurality of anomaly categories. A determination may be made, based on an application of the plurality of rules to data that is to be analyzed for an anomaly, whether the data includes the anomaly. In response to a determination that the data includes the anomaly, a device associated with the data may be controlled.

20 Claims, 12 Drawing Sheets

(56) References Cited

U.S. PATENT DOCUMENTS

| | | |
|---|---|---|
| 2012/0137367 A1 | 5/2012 | Dupont et al. |
| 2012/0151509 A1 | 6/2012 | McCarthy et al. |
| 2012/0290793 A1 | 11/2012 | Chung et al. |
| 2013/0110761 A1* | 5/2013 | Viswanathan ....... G06N 99/005 706/52 |
| 2013/0318615 A1 | 11/2013 | Christodorescu et al. |
| 2014/0096249 A1* | 4/2014 | Dupont ................... G06F 21/00 726/23 |
| 2014/0222726 A1 | 8/2014 | Mermoud et al. |
| 2015/0033084 A1* | 1/2015 | Sasturkar ............ G06F 11/0709 714/46 |
| 2015/0096024 A1 | 4/2015 | Haq et al. |
| 2015/0106324 A1 | 4/2015 | Puri et al. |
| 2015/0121518 A1* | 4/2015 | Shmueli .............. H04L 63/1425 726/22 |
| 2015/0134797 A1 | 5/2015 | Theimer et al. |
| 2016/0224899 A1* | 8/2016 | Nguyen ................ G06N 7/005 |
| 2017/0013003 A1* | 1/2017 | Samuni ................... G06F 11/00 |
| 2017/0124483 A1* | 5/2017 | Huang ................ G06N 99/005 |

\* cited by examiner

EVENT ANOMALY ANALYSIS AND PREDICTION

CROSS-REFERENCE TO RELATED APPLICATION(S)

This application claims the benefit of Provisional Patent Application Ser. No. 62/181,150, filed Jun. 17, 2015, which is expressly incorporated herein by reference.

BACKGROUND

Enterprise environments typically generate log files to record a variety of activities. Log content analytics (LCA) is the application of analytics and semantic technologies to consume and analyze heterogeneous computer-generated log files to discover and extract relevant insights in a rationalized and structured form.

BRIEF DESCRIPTION OF DRAWINGS

Features of the present disclosure are illustrated by way of examples shown in the following figures. In the following figures, like numerals indicate like elements, in which.

DETAILED DESCRIPTION

Figure 1:
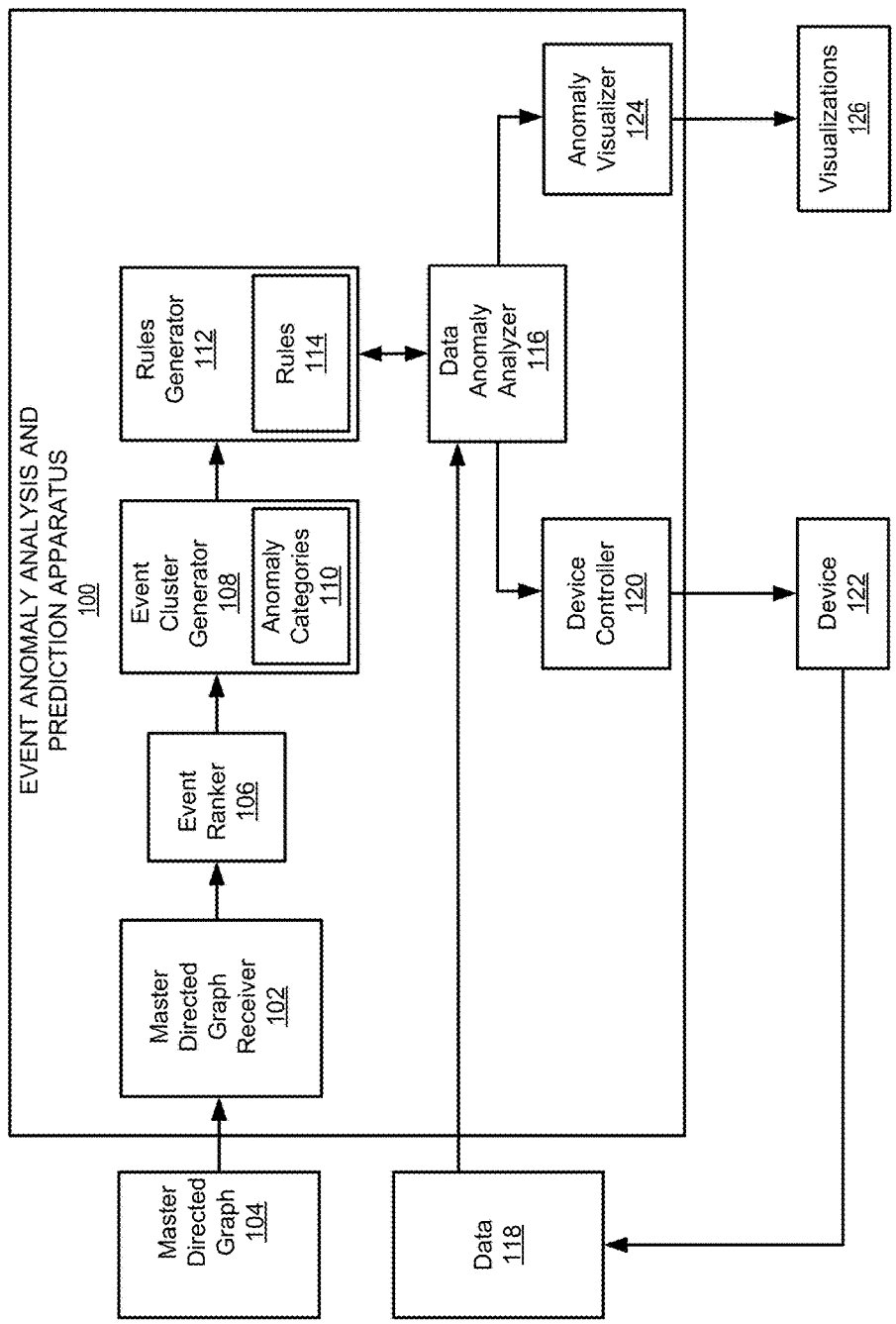
FIG. 1 illustrates an architecture of an event anomaly analysis and prediction apparatus, according to an example of the present disclosure.

For simplicity and illustrative purposes, the present disclosure is described by referring mainly to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Throughout the present disclosure, the terms "a" and "an" are intended to denote at least one of a particular element. As used herein, the term "includes" means includes but not limited to, the term "including" means including but not limited to. The term "based on" means based at least in part on.

The opaque nature of modern computing and networking systems makes them vulnerable to cyber adversaries or advanced persistent threats (APTs) presenting an ever growing threat to globally interconnected networks. Many enterprise environments need to manage copious amounts of log files where forensic evidence of those threats and suspect anomalies reside unnoticed in logs until it may be too late. Analyzing log data from many heterogeneous sources to find errors and anomalies can be difficult, both in terms of computation and information technology (IT) coordination. Learning the behavior of applications through log traces, understanding the flow of events that occur within many applications, performing analytics at massive scales, and performing analytics with low latency and rapid results with streaming data is needed when finding relevant security events and being operationally aware in real-time. Often data present in log files, or trace data, generated from a device source is characterized by attributes that include unique identifiers, timestamps, events, and actions. These unique attributes can be indicative of application behaviors, processes, and patterns created by a series of events. Data contained within the trace sources can be modeled as a graph containing information about states and transitions between them.

In order to address the aforementioned challenges related to log file analysis, an event anomaly analysis and prediction apparatus, and methods for event anomaly analysis and prediction are disclosed herein. The methods for event anomaly analysis and prediction may substantially perform the functionality related to the event anomaly analysis and prediction apparatus. The apparatus and methods disclosed herein may provide for the extraction of correlations between trace events within a log and the information surrounding the correlations such as probability of occurrence of trace log events, probability of transitions between particular trace log events, execution times of trace log events, and anomalous occurrences of trace log events.

The apparatus and methods disclosed herein may include monitoring of agent behaviors (e.g. users, applications, servers, etc.) to produce situationally aware graphs that represent views of actions taken on a network by various entities in real-time.

The apparatus and methods disclosed herein may expand upon domain knowledge in the corporate, cyber security, defense, and academic realms concerning the application of analytics to uncover anomalies such as intrusion attempts and difficult to detect surreptitious APTs. Examples of surreptitious APTs may include unauthorized access to classified information by a user who otherwise performs authorized access to non-classified information in a chain of access events. Armed with an ever-watching tool, capable of evolving over time providing context to events, an analyst may be confident that the tool will generate alerts, quarantine and control agents, and stop malicious behavior before irreparable damage occurs to the Enterprise and its assets.

With respect to the apparatus and methods disclosed herein, behavior learning may denote learning common behaviors that occur within an Enterprise network and transforming the behaviors into probabilistic event graphs (based on extract-transform-load or ETL, distributed storage, distributed processing, and machine learning).

With respect to the apparatus and methods disclosed herein, anomaly identification may denote understanding why events are more important than others and identifying anomalous events (utilizing machine learning techniques).

With respect to the apparatus and methods disclosed herein, real-time anomaly detection may denote detecting event chains with highly anomalous attributes based on learned behaviors (which uses messaging queues, complex event processing (CEP), and in-memory databases). CEP may be described as tracking and processing streams of event data (e.g., click streams or video feeds) from multiple sources to infer and identify patterns that suggest more complicated circumstances. An example may include validating security events against previously verified breaches of information in real-time to assess new threats. CEP may combine data from multiple sources to infer events or patterns that suggest more complicated circumstances. CEP may identify meaningful events (such as opportunities or threats), and enable organizations to respond to such events as quickly as possible. CEP may enhance streaming ingestion. CEP may also increase speed by pre-processing data, and caches, where in-memory databases IMDBs enable real-time interactivity.

With the vast load of data streaming within a corporate network increasing every day and as are the number of security vulnerabilities and exploits, the human security analyst may become quickly overwhelmed and become reactive rather than proactive.

In this regard, the apparatus and methods disclosed herein may deploy a differentiated technology asset that may effectively capture, learn, discover and provide actionable contextually relevant security information. For the apparatus and methods disclosed herein, network traffic patterns may be learned, anomalies may be extracted and graded, and rules may be created to inform key security activities for hunter teams in exploration, forensics, auditing, and decision-making. Furthermore, the apparatus and methods disclosed herein may complete the explanation of security events through example visualizations that increase usability and enable faster insight.

For the apparatus and methods disclosed herein, graph analysis matching techniques may be applied to tagged and ordered data representing agent behaviors (e.g., users, applications, servers, etc.). Incoming data may be associated with appropriate metadata. The data may be gathered from one or more sources for multiple agents from a particular source (e.g., application trace entries/log entries from a particular server). All observed and learned agent behavior may then be represented as a set of graphs, and algorithms may be applied to discover what is typical and what is anomalous. These learned behaviors may be mined for typical and irregular patterns to determine anomalousness of events and a compound set of events. This methodology creates models of behavior that can be segmented by users, roles, and groups as well as the degree of anomaly. Additionally the apparatus may learn information in both on-line and off-line modalities to create an ecosystem balance between responsivity, or sensitivity, of models and accuracy of any findings reported by graph models.

The apparatus and methods disclosed herein may provide for the application of log content analytics and trace event analytics to detect application behaviors and detect anomalies, and to provide guidance to those individuals seeking to understand the data present within log files.

The apparatus and methods disclosed herein may utilize machine learning techniques and open source technologies to increase data literacy and enable downstream security engagements.

The apparatus and methods disclosed herein may discover the existence of aberrations and other phenomena within incoming trace events as they occur in real-time.

The apparatus and methods disclosed herein may provide a contextual and intuitive metric for anomalous behaviors and patterns that exist within trace events as they emerge. Insight gained from real-time analysis may provide information that can be of use proactively and provide a metric for the contextual anomalousness of an event sequence when compared to the probability distribution of patterns present within an overall mined graph.

Additionally, the apparatus and methods disclosed herein may evolve over time and be adjusted for increased sensitivity for specific time periods as threats may evolve and agents may attempt to circumvent and evade detection.

The apparatus and methods disclosed herein may deliver a set of interactive visualizations explaining the underlying network ecosystem and threats as they occur through the use of visualization tools. The expressive and innovative visualizations may convey the importance of anomalies, which might otherwise go unnoticed.

The apparatus and methods disclosed herein may provide graph analytics and pattern matching techniques to detect anomalies throughout several stages of the cyber kill chain to discover APTs.

The apparatus and methods disclosed herein may encompass online capabilities with CEP techniques.

With respect to cyber security, the apparatus and methods disclosed herein may provide new ways to combat APTs, and include visualization and other tools that assist end-users with threat detection.

The apparatus and methods disclosed herein may ascertain known states and behaviors, and detect correlations across graphs using various techniques in graph theory, statistics, and probability.

The apparatus and methods disclosed herein may provide information concerning how closely events across logs sources are related to each other.

The apparatus and methods disclosed herein may implement a scalable and performant technique for collecting tag-and-track information of multiple sources, implement a platform environment suitable for integration testing and system validation, implement a CEP technology capable of evaluating policies in real-time, and define enforcement capability within the apparatus and enable enforcement of policies.

In addition to the collecting and processing environments, enabling enforcement of security policies is non-trivial. Application processes may be blocked at many different levels (e.g., application, operating system, hardware, network, etc.) and enforcement techniques may be dependent on the implementation level of the technology. The apparatus and methods disclosed herein may include the creation of technology enforcement reference capability architectures to define the level of enforcement which may be expected based on the complexity of the technology environment deployment. These aspects may be used to identify the optimal enforcement points while minimizing the impact of the network as a whole.

The apparatus and methods disclosed herein may include the implementation of a command and control system to enable the enforcement. The apparatus and methods disclosed herein may leverage visualization to increase usability and enable faster insight.

The apparatus and methods disclosed herein may be applicable in a variety of areas such as, for example, anomaly detection and tracking, application debugging, audit or regulatory compliance, digital forensic investigation, error tracking, operational intelligence, security incidence response, security policy compliance, etc.

For the apparatus and methods disclosed herein, according to an example, edges for a master directed graph may be removed from an object linked list. In this regard, all edges for a master directed graph may be tracked according to the number of times an event sequence has gone, for example, from a node A to a node B. If the number is below a specified threshold, that entry may be deleted.

The apparatus and methods disclosed herein provide technical solutions to technical problems related, for example, to anomaly detection in log file data. In many instances, anomaly detection in log file data can be a daunting task, for example, due to the extensive volume of such log files. The apparatus and methods disclosed herein provide the technical solution of accessing a master directed graph that specifies known events and transitions between the known events. Each of the known events may be ranked. The ranking of each of the known events may be based on a probability of anomalousness assigned to each of the known events, and the probability of anomalousness assigned to a known event of the known events may be determined relative to each of the other known events. Each of the ranked known events may be clustered into a plurality of anomaly categories. A plurality of rules to analyze new events may be determine, based on the plurality of anomaly categories. Data that is to be analyzed for an anomaly may be accessed. Based on an application of the plurality of rules to the data, a determination may be made as to whether the data includes the anomaly. In response to a determination that the data includes the anomaly, a device associated with the data may be controlled. In this regard, the apparatus and methods disclosed herein provide the technical solution to a technical problem of detection of an anomaly and/or controlling a device based on detection of an anomaly. For example, a device, such as an automatic teller machine (ATM) may be controlled to initiate a lock-down mode based on the detection of an anomaly related to access to the ATM. According to another example, a network may be placed in a secure mode based on detection of surreptitious APTs. Thus, any type of device may be controlled based on detection of an anomaly related to operation of the device.

FIG. 1 illustrates an architecture of an event anomaly analysis and prediction apparatus 100 (hereinafter "apparatus 100"), according to an example of the present disclosure.

Referring to FIG. 1, the apparatus 100 may include a master directed graph receiver 102 to access or generate a master directed graph 104 that specifies known events and transitions between the known events. An event ranker 106 may rank each of the known events of the master directed graph 104. The ranking of each of the known events may be based on a probability of anomalousness assigned to each of the known events, and the probability of anomalousness assigned to a known event of the known events may be determined relative to each of the other known events of the master directed graph 104. An event cluster generator 108 may cluster each of the ranked known events into a plurality of anomaly categories 110. A rules generator 112 may determine, based on the plurality of anomaly categories, a plurality of rules 114 to analyze new events. A data anomaly analyzer 116 may access data 118 that is to be analyzed for an anomaly. The data anomaly analyzer 116 may determine, based on an application of the plurality of rules 114 to the data 118, whether the data 118 includes the anomaly. In response to a determination that the data 118 includes the anomaly, a device controller 120 may control a device 122 associated with the data 118. The device 122 may include a device that supplies the data 118 as shown in FIG. 1, or a device that does not supply the data 118, but is controlled by the device controller 120. The device 122 may include any type of device including a processor capable of executing machine-readable instructions to perform one or more operations. An anomaly visualizer 124 may generate various types of visualizations 126 to facilitate an identification of anomalies in the data 118.

In some examples, the elements of the apparatus 100 may be machine readable instructions stored on a non-transitory computer readable medium. In this regard, the apparatus 100 may include or be a non-transitory computer readable medium. In some examples, the elements of the apparatus 100 may be hardware or a combination of machine readable instructions and hardware.

Figure 9:
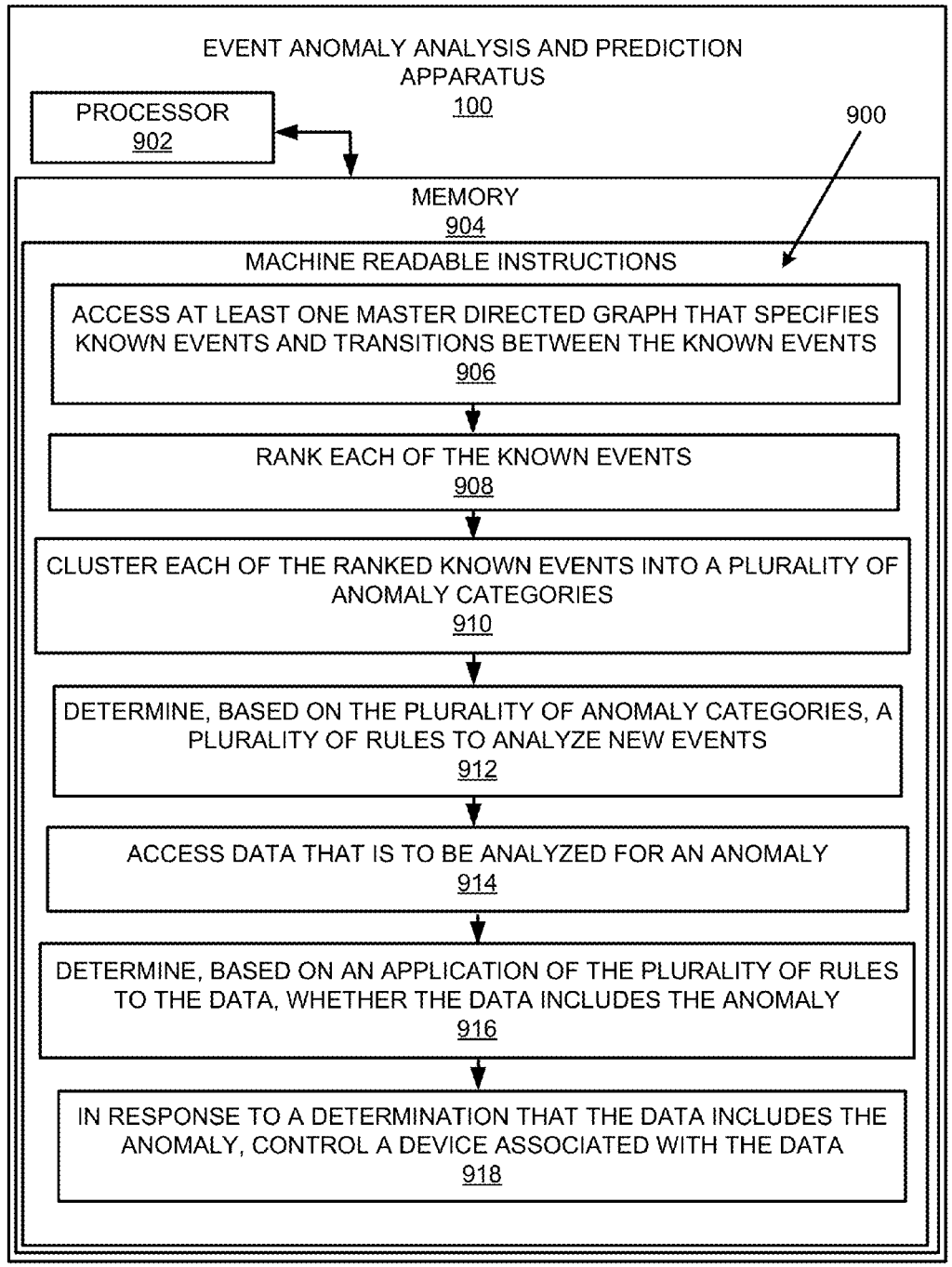
FIG. 9 illustrates a flowchart of a method for event anomaly analysis and prediction, according to an example of the present disclosure.

The operations of the apparatus 100 as disclosed herein with respect to the various elements of the apparatus 100 may be performed by a processor (e.g., the processor 902 of FIG. 9). For example, a processor (e.g., the processor 902 of FIG. 9) may perform the operations disclosed herein with respect to the master directed graph receiver 102, the event ranker 106, the event cluster generator 108, the rules generator 112, the data anomaly analyzer 116, and the device controller 120.

Operations of the apparatus 100 are described in further detail with respect to FIGS. 1-8.

For the apparatus 100, with respect to LCA, LCA may provide for the exploration, investigation, and enablement of analytics on semi-structured data sources that provide the data 118. Examples of semi-structured data sources include log files, and other such data sources. LCA may be used to uniquely identify events, event probabilities and statistics, and discover the temporal relationships between events.

Data present in log files may be characterized by log traces containing unique identifiers, timestamps, events, and actions. These unique attributes may be indicative of underlying behaviors of applications, the processes that may interact with applications, and the subsequent patterns that exist and may have been created by a series of events. Through mining and correlation of the information contained within the log files (e.g., a set of traces), LCA may be modeled as the master directed graph 104 with statistics, event states, and transition probabilities among events. Upon establishing the master directed graph 104 of normalized data, the incoming data 118 may be analyzed for anomalies by the data anomaly analyzer 116 using graph matching, pattern recognition, or other techniques, such as correlation algorithms, to extract anomalies and risks. The data anomaly analyzer 116 may support computing system transparency by applying analytics to (semi-) automatically consume and analyze the data 118 that includes heterogeneous computer generated trace entries. The rules generator 112 may serve to create the rules 114, which may be in the form of models of agent behaviors, for a given source, type of data, time of day, day of week, etc. The rules 114 may be used to perform anomaly detection and discover complex behavior sets that are indicative of APTs. The rules 114 may exemplify the anomalousness of events from analyzing all paths that lead to a particular node from the master directed graph 104.

With respect to the master directed graph 104, the master directed graph 104 may be used to abstract and model the dynamics of relations for a variety of systems. For example, the World Wide Web may be represented by a graph in which nodes correspond to webpages and edges correspond to hyperlinks.

The apparatus 100 may include three techniques for learning, detection, and enforcement suggestions of anomalous activities, with respect to operations of the rules generator 112, the data anomaly analyzer 116, and the device controller 120.

The first technique may include behavior profiling through a set of diverse models of varying granularity, time, users, and groups. The second technique may include approximated behavior profiling through rapid ingestion and learning in real-time. The third technique may include continuous authentication of newly tagged behaviors mapped against learned behavior sets.

Figure 2A:
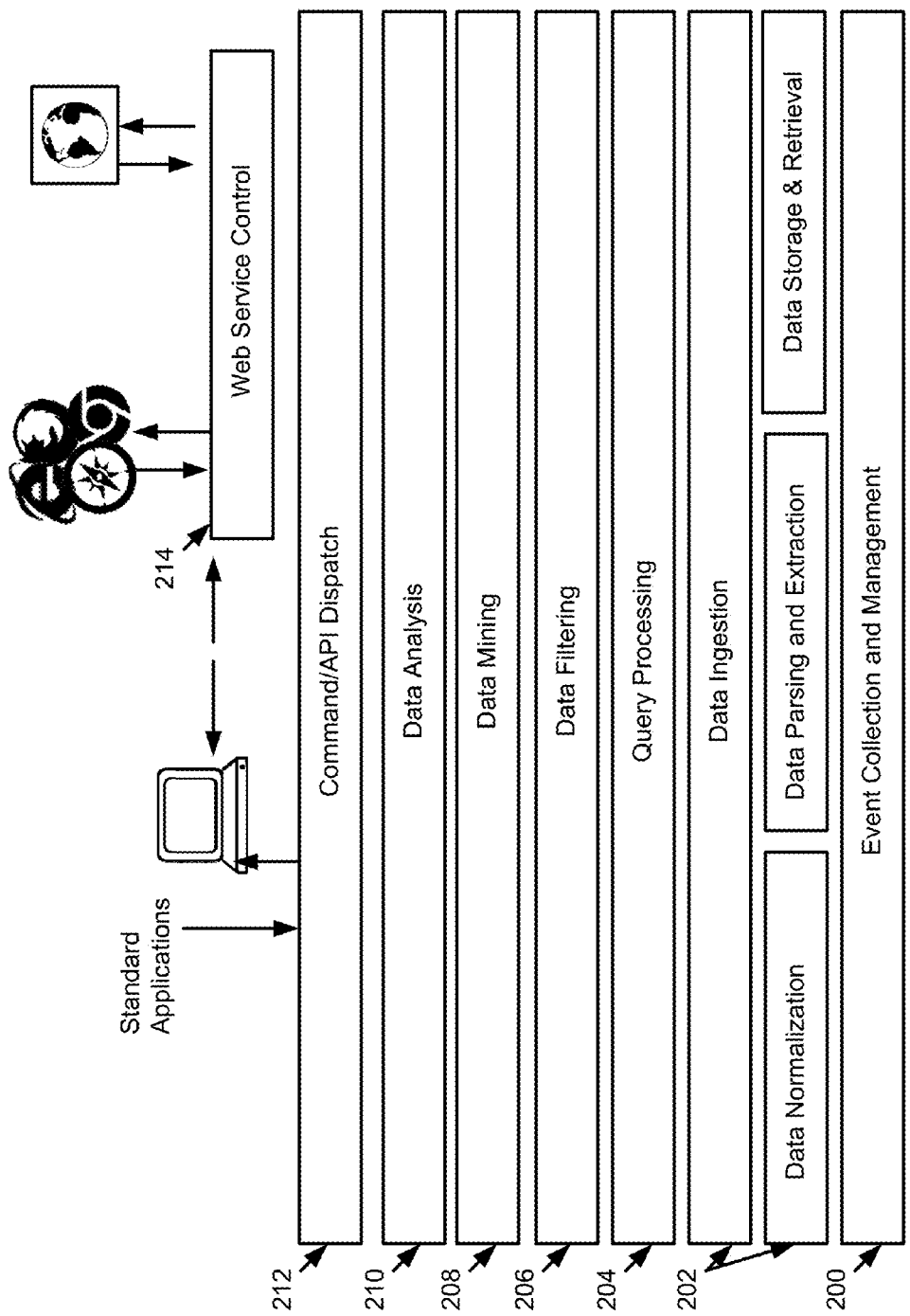
FIG. 2A illustrates a framework stack for the event anomaly analysis and prediction apparatus of FIG. 1, according to an example of the present disclosure.

FIG. 2A illustrates an LCA framework stack for the apparatus 100, according to an example of the present disclosure.

The LCA framework stack may include a plurality of layers for data collection (i.e., event collection and management), data ingestion (normalization, parsing, and storage), query processing, data filtering, data mining, data analytics, an API wrapper allowing for extensive use and interplay with other tools and visualization applications to complete all necessary analytics, and web services control.

With respect to the data collection (i.e., event collection and management) layer at 200, the data anomaly analyzer 116 of the data collection layer may control the access and instruction set needed to enable collection of data between an operational log management (OLM) provider and the LCA framework.

Application, server, or device generated log files and traces may be difficult to analyze in an automated or semi-automated way. For example, a server log may record both successful and failed login attempts for millions of users. Such examples may be viewed as a problem in anomaly detection (with the anomaly being the intrusion attempt).

The data anomaly analyzer 116 may extract information from a multitude of sources or vendor solutions. This data collection layer with respect to the data collection (i.e., event collection and management) at 200 may control the access and instruction set needed to enable a smooth transition of data between tools, such as an operational log management (OLM) provider and the remainder of the framework.

The support of an event management system will be comprised of, at a minimum, a collection system that has a message queue. Additionally the underlying architecture may support relatively large storage for batch mode learning, and CEP systems for real-time learning. A system or set of systems may be needed to accept incoming data connections from multiple sources. In this regard, detection and enforcement may rely on the architecture of the apparatus 100 to provide the framework for these integration requirements to ensure proper execution.

The data anomaly analyzer 116 may handle information from multiple sources and provide the management needed for alignment of datasets and ultimate channeling of data to the data analytics layer. Additionally, the data anomaly analyzer 116 may ensure that all data will be in sequential temporal order for rapid data ingestion and optimal memory usage. The data anomaly analyzer 116 may perform data normalization as well to transform incoming traces into single lines as opposed to multiple line traces.

According to an example of network security events, the data 118 for the data anomaly analyzer 116 may include log files of network security events from all the devices on a network such as laptops, workstations, servers, routers, switches and intrusion detection systems and anti-virus systems. The data anomaly analyzer 116 may receive a nightly feed of encrypted, compressed logs into a staging server. The data 118 may be analyzed for anomalies as disclosed herein.

Referring to FIG. 2A, for the data ingestion layer at 202, the data anomaly analyzer 116 may be comprised of components that perform the tasks of normalization, parsing and extraction, and storage and retrieval. Data ingestion may also be divided into offline and online modalities and the execution of the modalities may be performed in tandem or otherwise depending on hardware specifications and configuration.

With respect to offline-learning, the platforms needed for management of a batch of events may include a large scale distributed data store for storage of raw traces, or other query-able data stores capable of rapid ingestion. In both cases, the data anomaly analyzer 116 and the accompanying data stores may need to provide scalability horizontally with redundancy in case of storage failure.

With respect to online-learning, for real-time learning, a CEP solution environment over which analytics may be performed may be implemented. As trace events are tagged and ingested, for example, by CEP, a model representing agent behaviors may be learned in real-time. As information is tagged with agent information and other metadata, statistical learning techniques may be applied to understand the importance of new trace events and their place within the larger model of given granularity. Online learning may produce a representative model of the relationships of trace events that have occurred. All data handled for real-time analysis and learning may be handled (queued, tagged, enriched, etc.) inside a CEP engine, and the data may be exported from the CEP engine to perform subsequent tasks.

The online modality may provide a first layer approach to learning new models while a more thorough and exhaustive model may be compiled from stored offline data.

With respect to data normalization for data ingestion at 202, the data anomaly analyzer 116 may provide for the normalization of data into an agnostic format that the apparatus 100 may consume. For example, data may be normalized by converting timestamps to ZULU time. Normalization of data may be performed via customizable connectors that allow for reuse. Additionally, normalization may occur in real-time.

With respect to parsing and extraction for data ingestion at 202, the data anomaly analyzer 116 may serve to take incoming data and parse the incoming data. For example, at a minimum, the parsing and extraction may include extracting the relevant fields and attributes for an agent identifier, time of trace occurrence, type of event, action, and description information.

With respect to storage and retrieval for data ingestion at 202, the data anomaly analyzer 116 may provide the capability to load and store graph models generated and used for the apparatus 100. Storage and retrieval may be performed for storing graph model relationship information including transition probabilities, event probabilities, and statistics for linkages and captured event information. Graph databases and other NoSQL rapid ingestion and retrieval mechanisms may be employed for storage and retrieval.

Referring again to FIG. 2A, with respect to the query processing layer at 204, the data anomaly analyzer 116 may provide mediation and interface functionality into lower layers for layers higher in the stack in the orientation of FIG. 2A. The data anomaly analyzer 116 may serve the purpose of providing an abstraction layer away from the underlying OLM providers and specific data storage formats.

With respect to the data filtering layer at 206, the data anomaly analyzer 116 may perform filtering of any data that has been analyzed. The data anomaly analyzer 116 may single out any events or edges based on predefined metrics.

With respect to the data mining layer at 208, the data anomaly analyzer 116 may perform data extraction and discovery of relationships within the data 118. The data mining may be controlled directly via a plugin framework. Graph aggregation and mining may occur in the data mining layer.

With respect to the data analysis layer at 210, the data anomaly analyzer 116 may perform the analysis of the data 118 that has been mined and extracted, e.g., event clustering. The data anomaly analyzer 116 may also perform the anomaly detection through various means of traversing the master directed graph 104 to understand how trace events relate to each other and how complex set of events match or don't match known patterns.

With respect to the example of network security events as disclosed herein, the data anomaly analyzer 116 may identify events, event probabilities and statistics, and discover the temporal relationships between events.

With respect to the API layer at 212, the API layer may facilitate interplay with respect to analytics, mining, graphs, etc., that may need to be extracted for end user consumption. The API layer may operate as an interface for any visualization that may need access to data not immediately available via a graph model but that may require additional or ad-hoc analytics performed. The API layer may serve as an orchestration layer between the command line, lower layers, and web services.

With respect to the web service control layer at 214, the web service control layer may allow for additional applications, queries, and other visualizations to be built as needed. The web service control layer at 214 may provide a common interface that applications may make calls to. The web service control layer at 214 may serve to provide an additional extensible interface for future visualizations, algorithms, and additional analytics that may be added for greater functionality. The web service control layer at 214 may expose the functionality of the framework of the apparatus 100 to external tools.

The framework of FIG. 2A may allow for the application of any number of mining analytics, algorithms, and filtering to be applied, for example, through extensible plugins. Each of the individual mining algorithms may execute in parallel through the distributed paradigm, and other such techniques. Information may flow from one mining algorithm to the next to generate new jobs as needed or as scheduled based on a profile or a configuration. Various aspects of the framework may be plugin driven and therefore is extensible. To produce a different model or result requires only a different configuration with differing plugins enabled. In the form of FIG. 2A, the framework may produce a model of log files as represented by a directed graph for the purpose of detecting complex anomalous behaviors as well as event correlation. However, the framework may be configured to produce a different model. Multiple mappers may be instantiated that model aggregation at a reducer stage.

Figure 2B:
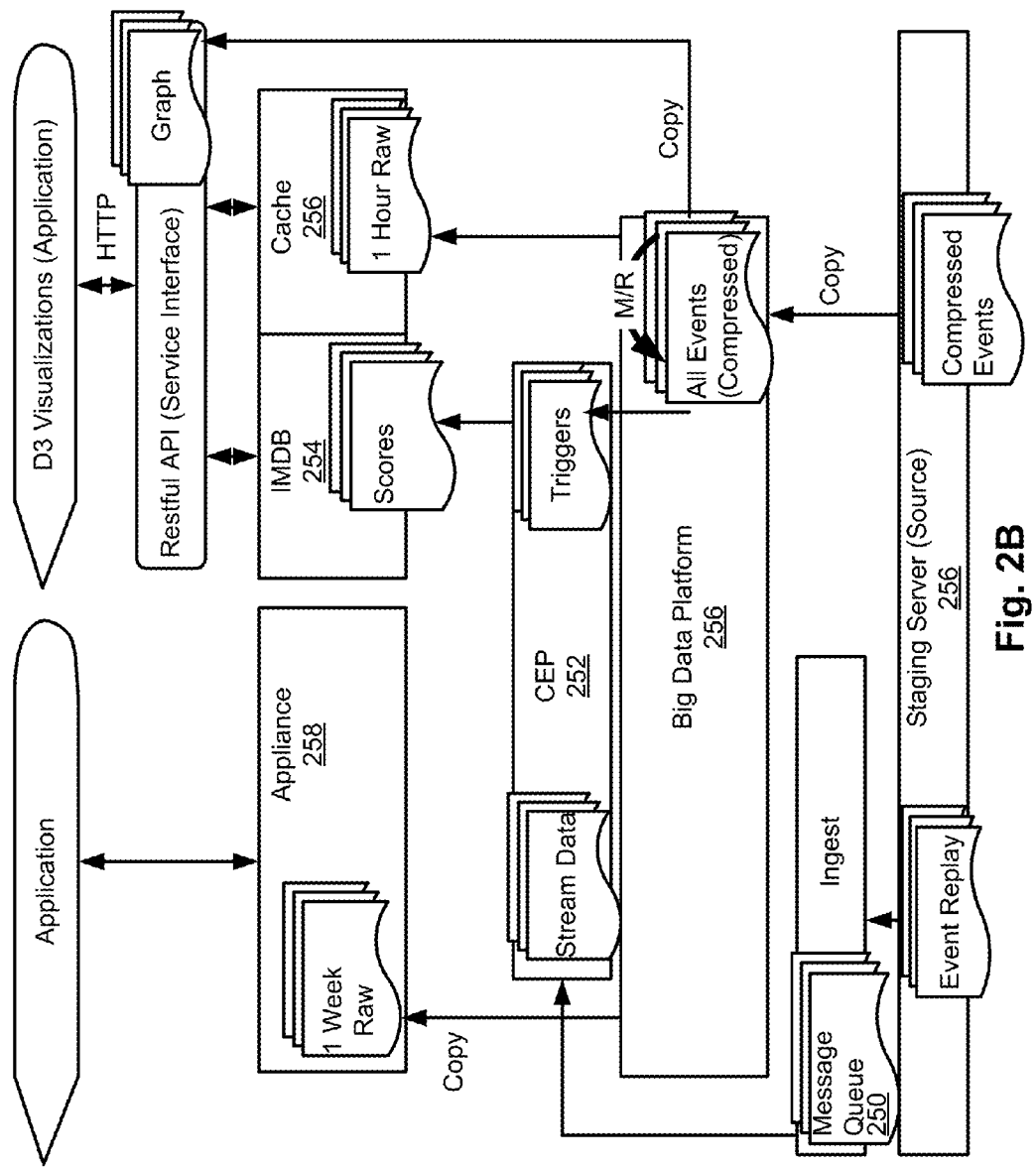
FIG. 2B illustrates a logical architecture for event anomaly analysis and prediction, according to an example of the present disclosure.

Referring to FIGS. 2A and 2B, with respect to real-time processing of a data stream, a message queue 250 may collect and organize events which are pulled by downstream subscribers, CEP 252 may be applied to evaluate events based on programmed or dynamic rules/algorithms to identify key information, and an IMDB 254 may be used for simple to complex calculations, model executions, and statistical comparisons. A Java™ script may create a simulated stream from log files, for example, from a staging server 256. Each event trace from an input source may be ingested into the message queue 250 on a specific topic. The message queue 250 may be consumed, and rapid filtering, correlation, aggregation and detection of patterns across multiple streams of real-time data may be performed by the CEP 252. When an anomalous event is encountered, the anomalous event may be flagged and stored in the IMDB 254. For example, when an event is encountered by the CEP 252, the CEP 252 compares the event with the logic (i.e., rules) encoded in the CEP 252 to determine if there is a pattern match (i.e., if the incoming event matches the pattern of an anomalous event (as identified earlier from the historical, real-time, and graph based intelligence analytical results)). In response to a determination that there is a pattern match, the event is flagged as an anomalous event and stored in the IMDB 254.

A big data platform 256 may be described as a distributed file system and compute engine that may be used to facilitate data movement and processing. The big data platform 256 may include a big data core (BDC) with a distributed data storage/computer cluster with distributed data storage, computing power, and may function as a platform for additional computing including data interactivity. For example, advancements in big data technologies have enabled BDCs to function as a platform for additional types of computing, some of which (e.g., query processors) may specifically support data interactivity. The big data platform 256 may be job based, where calculations are scheduled to run at a certain interval rather than being performed in real-time. The big data platform 256 may leverage replication and distributed parallel processing on large datasets, which enables advanced analytics. Applications and services may access the big data platform 256 directly and deliver improved performance on large, unstructured datasets. Additional enhancements to a big data core focus on creating fast interfaces with data on a cluster. The big data core may store semi-structured data (such as Extensible Markup Language (XML) and JavaScript Object Notation (JSON), and unstructured data (word documents, pdfs, audio files, and videos), and may employ map/reduce functionality to read. Query engine software may enable the creation of structured data tables in the core and common query functionality (such as structured query language (SQL)).

The CEP 252 may be described as tracking and processing streams of event data (e.g., click streams or video feeds) from multiple sources to infer and identify patterns that suggest more complicated circumstances. An example may include validating security events against previously verified breaches of information in real time to assess new threats. The CEP 252 may combine data from multiple sources to infer events or patterns that suggest more complicated circumstances. The CEP 252 may identify meaningful events (such as opportunities or threats), and enable organizations to respond to such events as quickly as possible. The CEP 252 may enhance streaming ingestion. The CEP 252 may also increase speed by pre-processing data, and caches, where IMDBs enable real-time interactivity.

The CEP 252 may be used for performing real-time analytics and driving real-time insights. As new data streams in from its sources, pre-processing and aggregation may respectively perform the initial pre-processing and transformations to count parts of the data and use the totals to expedite future processing of data batches. The pre-processing and aggregation may be performed by combining historical data with new data, matching the data against pre-determined patterns as well as inferring new patterns in the data, and triggering events and actions based on the detected patterns, delivering real-time insights for decision making. An advantage of the CEP 252 is the immediacy of the insights and actions it facilitates, compared to users having to wait for an overnight batch-processing job to be completed. The increased processing speed stems from the fact that data movement and processing occur in parallel, backed by in-memory computations. The CEP 252 differs from ingestion solutions in that the CEP 252 includes the added processing power to perform calculations on the initial data before the data is consumed by a datastore or a file system. For example, with batch processing, a map/reduce job may be performed once all the data (in files) exists. As a map/reduce job may take a relatively long time to execute based on the amount of data, and the complexity of the algorithms in the map/reduce job, in contrast, the CEP 252 operates on one record at a time. Each record or event (in a file) may be consumed by the CEP 252 and is pre-processed (i.e., the data is enriched by adding to it or transforming it). Thus, by using the CEP 252, results may be obtained, or an action may be triggered after every record, instead of waiting for an entire file to process as with batch processing. For example, with batch processing, data may need to be first moved into a system before processing. For the CEP 252, the data may be processed in parallel with movement/ingestion of the data. Thus, with the CEP 252, data movement and processing may be achieved at the same time to increase the speed of data analysis.

The IMDB 254 may be described as a database management system that relies primarily on main memory for data storage. The IMDB 254 differs from database management systems that use a disk storage mechanism. The IMDB 254 includes low latency with simpler algorithm internals requiring fewer central processing unit (CPU) instructions and experience faster seek times. Moreover, accessing data in memory eliminates the "seek time" involved in querying data on disk storage, thus providing faster and more predictable performance. Because the IMDB 254 constrains the entire database and the applications to a single address space, the IMDB 254 reduces the complexity of data management. Any data may be accessed within just microseconds.

A cache 256 (or cache cluster) may be described as a cluster of servers acting as in an memory layer intermediary with centralized management software mitigating load from upstream data sources to applications and users. The cache 256 may be maintained in memory and may offer high-speed access to frequently accessed data. The cache 256 may reside between the data source and data consumer. The cache 256 may be used when there is an extremely high volume of reads from multiple sources of data that does not change often, or when a database is stored on disk where seek time can be sub-optimal. The cache 256 may perform caching operations on a large scale. For example, the cache 256 may accommodate operations such as reading and writing values. The cache 256 may be populated when a query is sent from a data consumer (e.g., a client application) to a data source (e.g., a disk). The results from the data source are then stored in the cache 256 (e.g., a memory cache). In this manner, if the same query is received again, the query does not need to be sent to the data source for retrieval by the data consumer. Query receipts build up over time in the cache 256. When a data consumer requests data stored in the cache 256, then the cache 256 responds by accessing the data source, unless specific parameters are met (e.g., time since the last refresh). Pre-populating data into the cache 256 with data that is known to be frequently accessed may decrease processing requirements on underlying systems after a system restart. Data grids add support for more complex query operations and certain types of massively parallel processing (MPP) computations.

An appliance 258 may be described as a prepackaged unit of hardware (e.g., servers, memory, storage, and input/output channels), software (operating system, database management system, and administrative management software), and support services built with redundancy to provide reliability, while utilizing a common database for online transaction and analytic processing to reduce system latency. The appliance 258 may include a common database for both online transaction processing and online analytical processing. These aspects reduce delays in data movement, processing, and interactivity.

With respect to processing of log files in the trace analysis framework, the apparatus 100 may include a preprocessing stage that may include the selection and ingestion of trace event information into a query-able format for normalization. Once normalized, the framework may proceed to mine the log traces for their placement in a behavior graph model with a mining algorithm. The mining algorithm may discover the temporal ordering between trace events based on an ordering or timestamp that may be present in a log file and an identifier that groups log traces together. That is, the mining algorithm may extract an event type and an identifier for each ingested trace entry. The framework may index the event and identifier pair to create a series of compound event sequences. The power of the framework may come from the ability to execute several mapper functions with the capability to normalize data on-the-fly, with each producing a localized version of a network graph model for the data. Additionally, the algorithm may discover and sort the temporal relation between events based on an ordering that may be present in the log file and an identifier that groups the security log traces together (e.g., internet address). Security event traces may be combined to create event sequences that aggregate to create a master graph model with statistical information on the likelihood of transitions between events, likelihood of the occurrence of events, and other relevant metadata. Statistics may be computed based on the occurrence of any event over localized mined sets, as well the probability of transition between any pair of events. Multiple mapper functions may be instantiated to perform normalization, mining, and model creation. A reducer may then aggregate localized network graph models to produce a larger holistic network graph model in the form of a directed cyclic graph depicting the overall structure for any given log file. The framework is capable of having any number of mining algorithms that have map-reduced pipelined execution. That is, the output of one mining map-reduced algorithm is sent to the input of the next map-reduced mining algorithm.

Figure 3:
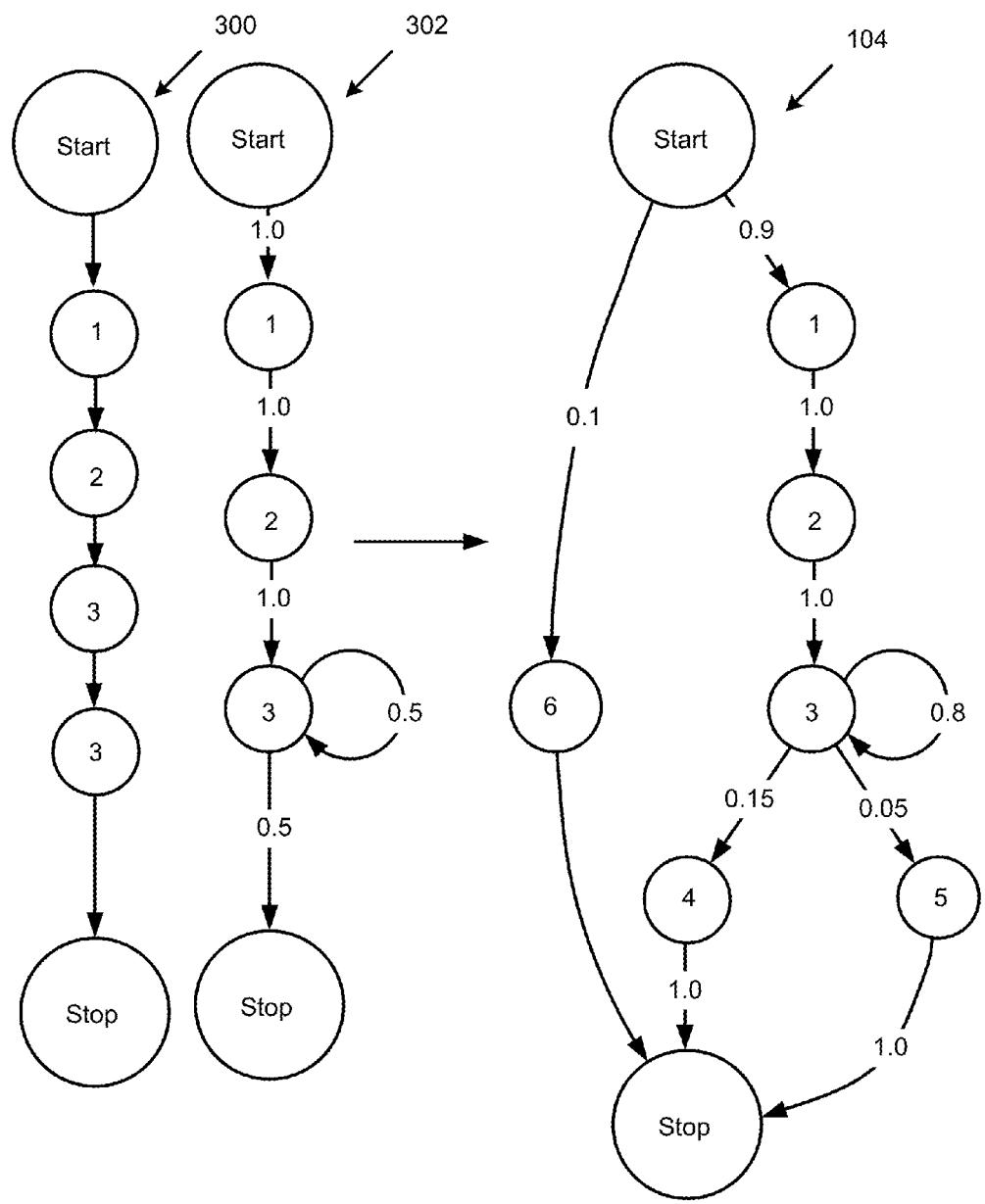
FIG. 3 illustrates a master directed graph with labels, weights, and start-stop nodes for the event anomaly analysis and prediction apparatus of FIG. 1, according to an example of the present disclosure.

FIG. 3 depicts an example of a master directed graph (i.e., a directed cyclic graph (DCG)) from a mined input log file where each of the nodes corresponds to an event within the log with overlapping identifier features. For the master directed graph 104, an example of a trace entry may include "114.135.67.66,,,, 583064f457f9de54307835f738ab09c671e596dd5db6b40b0d3a9 e102e256bee,3ZUB5Zj8BABCAA7H4FDTC+Q=,,,20 Feb 2014 22:59:09 EST,Low,US/Eastern,-18000000,,,,,,,,, superagent_ng,5.2.5.6403.0,,,". The graphs 300, and 302 represent trace graphs that are used to generate the master directed graph 104. The master directed graph 104 of FIG. 3 includes labels, weights, and start-stop nodes for the apparatus 100. It should be noted that although FIG. 3 depicts an example of a master directed graph with edge transition likelihoods, in reality, a master directed graph may include many nodes with thousands of inter connecting transition links. Timestamps determine the direction of the arcs and probability of transitions between events. Arbitrary start-stop nodes may be placed in the master directed graph to depict predominate starting points of mined trace sequences.

Once a series of trace sequences have been mined and an aggregate model created, analytics and filtering may be performed. The data anomaly analyzer 116 may be executed in a precedence ordered pipeline process with each plug-in receiving the output of the last. The framework may have any number of filtering plug-ins with each receiving the same data from the last pipelined analytics algorithm as the other, and returning either a true or false according to whether each event or edge from a mined model passes inspection. As each event or edge is filtered, information regarding the reason for returning a passing grade of true is stored and may be retrieved for later querying from a mined model.

As a number of event sequences increases, there may be an increased need for memory to perform the mining process. To address resource constraints of memory, event sequences may be time bound in length such that the first and last event in a sequence may not have a time difference greater than a specified threshold (typically 24 hours). To increase speed, the framework may also assume that trace entries are served in order.

The data anomaly analyzer 116 may ingest a portion of a file or subset of a group of files (i.e., from the data 118), and learn a graph for that portion of the trace entries. As each mapper completes its task, its graph is merged with other graphs through a series of reducers to create a final master graph representative of all behaviors for a given slice of time.

With respect to anomaly extraction and ranking, once the data anomaly analyzer 116 learns a series of network agent behaviors as a graph model, then the anomalies within a network may be discovered.

The master directed graph 104 with likelihood transition information may be considered similar to a web graph with documents. Thus, a ranking process may be applied over the master directed graph 104 to discover the importance of any given event node with respect to others. An example of a ranking process may include a PageRank™ process.

PageRank may be described as a technique to rank a node with respect to other nodes in the master directed graph 104. PageRank is a way of measuring the importance of nodes. PageRank operates by counting the number and quality of links to a node to determine a rough estimate of how important the node is. The underlying assumption is that more important nodes are likely to receive more links from other nodes. For example, for PageRank, the event ranker 106 may assign a numerical weighting to each node of the master directed graph 104, with the purpose of measuring each node's relative importance within the master directed graph 104. The numerical weight that is assigned to any given node N may be referred to as the PageRank of node N and denoted by PR(N). The numerical weight may correspond to the likelihood of transition to the given node. For example, for the master directed graph 104, the numerical weight for the node 1 may be 0.9, for the node 2 may be 1.0, etc. Alternatively, user-defined numerical weights may be assigned to each node of the master directed graph 104.

Opposite to the goals of search engines, which seek to return the set of most relevant nodes or documents in the graph, the event ranker 106 returns the least relevant node events and hence the most anomalous in this context. The event ranker 106 may use a set of probability values as the basis for automatically creating rules that contain the degree of anomalousness of streaming network event data. Each rule may be composed of several parts, where the first part is the event (including the event source), the first number is the anomaly category (Very High, High, Medium, Low, Very Low) expressed, for example, as a value from 0 to 4, and the second number is the probability of anomalousness of the event. Five examples of rules include the following:
1. 'CISCO::Deny HOPOPT reverse path check', 0, 0.00084952537103525564.
2. 'Juniper::User Client Server Session Change', 0, 0.00084952537103525564.
3. 'CISCO::end configuration', 0, 0.00084952537103525564.
4. 'NetScreen::Vsys admin user logged on via Telnet from remote IP address using port', 0, 0.00084952537103525564.
5. 'NetScreen::SSH: Password authentication failed for admin user', 0, 0.00084956880197824822.

For example, the rule "'CISCO::Deny HOPOPT reverse path check', 0, 0.00084952537103525564" indicates that if the incoming event 'CISCO::Deny HOPOPT reverse path check' matches a known event in a rules watch list, the incoming event is categorized (e.g., on a scale of 0-4) according to how the event has been classified. For this example, the incoming event 'CISCO::Deny HOPOPT reverse path check' is classified as "0", which represents a "Very High" anomaly category. If an event is highly anomalous (as well as for all anomaly categories), then the rule may include an associated action. For example, for the rule "'CISCO::Deny HOPOPT reverse path check', 0, 0.00084952537103525564", the associated action may include deny or quarantine the source (e.g., CISCO), etc.

Once anomaly probability values are calculated for every event node in a graph model, the event cluster generator 108 may apply k-means clustering with a randomly seeded centroid and a defined centroid displacement value indicating stability to rank the values into five distinct anomaly categories 110 as follows: very-high, high, medium, low, and very-low may be applied. A cluster may represent a group of events. The probability values calculated for every event node in the master directed graph 104 may be described as the probability of transition from a node to any other node in the master directed graph 104. For example, for the master directed graph 104 of FIG. 3, a probability of transition may be determined for the node 1 to the nodes 2, 3, 4, 5, and 6. Similarly, a probability of transition may be determined for the node 6 to the nodes 1, 2, 3, 4, and 5, and so forth.

The event cluster generator 108 may be used to extract and categorize anomalousness scores for all events within a given model (i.e., a master directed graph). For example, the event cluster generator 108 may use k-means clustering on the ranked anomalousness values to produce distinct anomaly categories 110 based on ranking scores from high anomalousness to low anomalousness with a randomly seeded centroid and a defined centroid displacement value indicating stability. These categorizations may be fed into a real-time CEP engine to generate rules to grade new events for a given time of a day to aid analysts and help provide context to risk assessments. For example, as disclosed herein with respect to the incoming event 'CISCO::Deny HOPOPT reverse path check', the categorization of the associated known event from the master directed graph 104 may be fed into a real-time CEP engine to generate the rule "'CISCO:: Deny HOPOPT reverse path check', 0, 0.00084952537103525564" to grade the incoming event 'CISCO::Deny HOPOPT reverse path check' for a given time of a day to aid analysts and help provide context to risk assessments.

In addition to mining, analytics may be performed on learned graphs to extract anomalous behaviors. Analytics may be applied to discover, detect, and provide guidance on enforcement of how anomalous a given event is with respect to others in two ways. First, analytics may be applied by analyzing learned behavioral graphs and extracting anomalous rankings of events with respect to other preceding events. Second, analytics may be applied by analyzing sequences of behaviors and discovering how much an emerging set of actions differ from known behavior patterns.

Anomalous behaviors may have a probability associated therewith. In this regard, the event cluster generator 108 may rank anomalous behaviors into five buckets/categories according to their probability (very-high, high, medium, low, and very-low). The five categories, along with the probability values, may serve to provide intuitive metrics. The discovered anomalies may be used for creation of a set of rules over which the data anomaly analyzer 116 will grade the data 118 that includes a stream of causally tagged event traces. This may serve to narrow the scope of further information processed, and provide a high level view of activities occurring across a system or network, and thus provide a view of the defense in depth or health of an ecosystem.

With respect to the classification of event probabilities into the five categories of very low probability, low probability, medium probability, high probability, and very high probability of occurrence, the event probabilities may be inverted and mapped to the corresponding anomaly category (e.g., a very low probability of occurrence for a particular event correlates to that event being very highly anomalous), resulting in the five anomaly categories of: very high, high, medium, low, and very low.

Analyzing sets of behaviors as a whole and comparing to the patterns that exist within a larger graph allow for the discovery of the persistent threats that are difficult to detect, and for discovering attack categories that take place.

Figure 4:
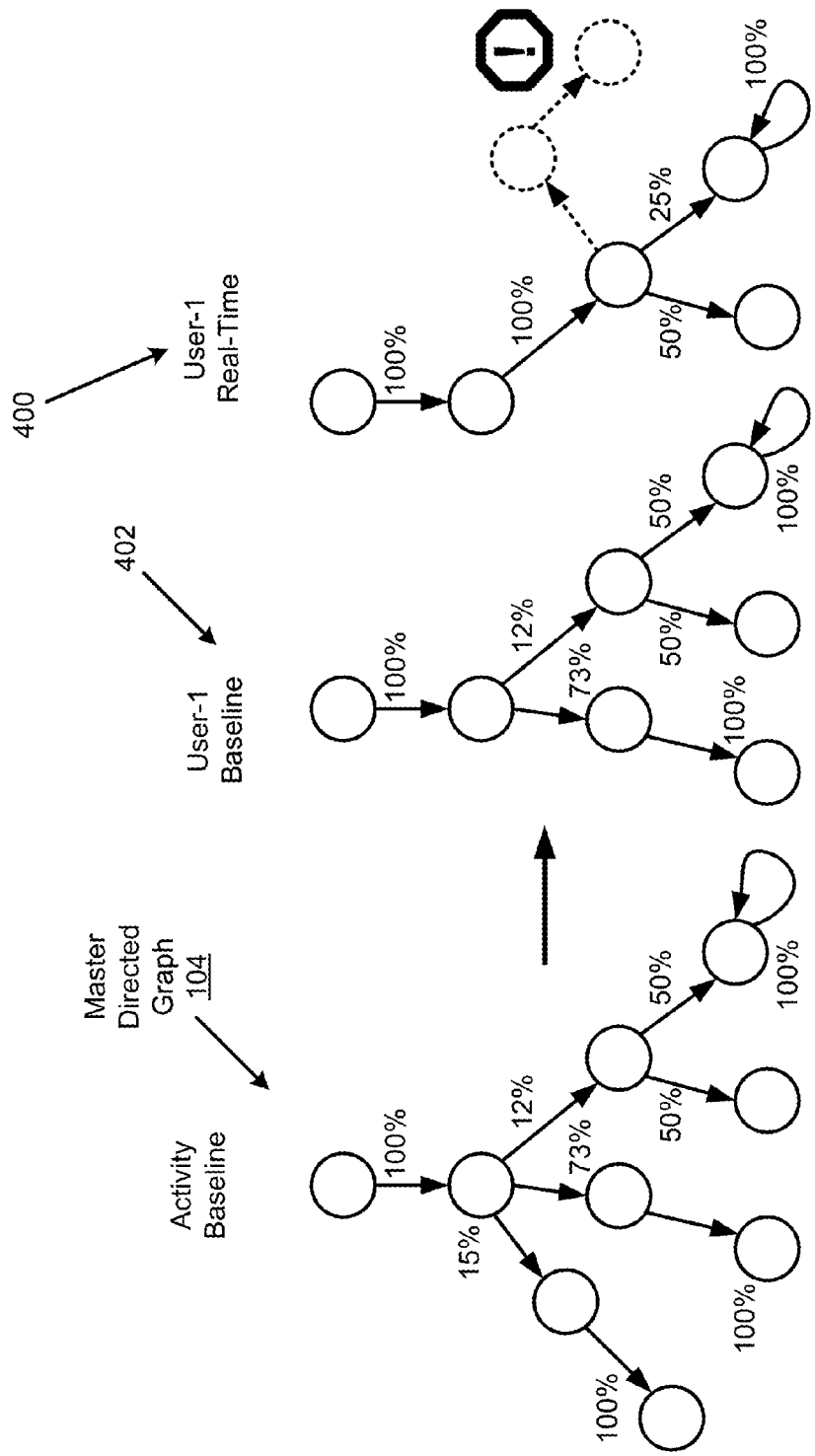
FIG. 4 illustrates anomalous behavior identification based on activity baselines for the event anomaly analysis and prediction apparatus of FIG. 1, according to an example of the present disclosure.

FIG. 4 illustrates anomalous behavior identification based on activity baselines for the apparatus 100, according to an example of the present disclosure.

Referring to FIGS. 1 and 4, when attempting to discover activities, the data anomaly analyzer 116 may compare graph patterns to one another. For example, for sets of agent behaviors that deviate from the norm or sets of activities that closely mimic known behaviors, the data anomaly analyzer 116 may grade how close an event set converges or diverges from known information. The data anomaly analyzer 116 may perform this analysis by measuring graph similarity within the context of anomaly detection for behaviors that a framework mines from tagged trace entries. In this regard, the data anomaly analyzer 116 may categorize how a graph representing a set of events differs from the master directed graph 104 that represents known or pre-established events. For example, as shown in FIG. 4, the data anomaly analyzer 116 may categorize how a real-time activity graph for a user-1 at 400 differs from a user-1 baseline at 402, which is determined from the master directed graph 104 that represents known or pre-established events. For example, the "dashed" lines for the real-time activity graph for a user-1 at 400 represent anomalies with respect to the master directed graph 104. In this regard, based on the rules 114, an event such as the "dashed" lines for the real-time activity graph for the user-1 at 400 may have been characterized as a very-high anomalous event (since no corresponding event such as the "dashed" lines exists in the user-1 baseline at 402 or in the master directed graph 104). In this regard, any event that is not present in the user-1 baseline at 402 or in the master directed graph 104 may have been categorized as highly anomalous. Alternatively, assuming that the master directed graph 104 includes an anomalous categorized event (not shown in FIG. 4) such as the event including the "dashed" lines, based on a match of the event including the "dashed" lines with the corresponding anomalous categorized event from the master directed graph 104, the event including the "dashed" lines may be categorized accordingly. That is, the data anomaly analyzer 116 may determine a bounded metric to characterize the degree of contextual fitness or anomalousness of an incoming walk of trace events or graph (e.g., the real-time activity graph for the user-1 at 400) compared to that of another walk or graph (e.g., the user-1 baseline at 402). Accordingly, based on the rules 114, the data anomaly analyzer 116 may characterize the "dashed" lines for the real-time activity graph for the user-1 at 400 as a very-high anomalous event.

Thus, the data anomaly analyzer 116 may grade an incoming or emerging (in-flight) sequence of events against the probabilistic rankings of all known event walks that are contained within the master directed graph 104. The computation of the metric may be based on the graph structure, with the results yielding a probabilistic insight on graph similarity. For the example of FIG. 4, the data anomaly analyzer 116 may determine whether the real-time activity graph for the user-1 at 400 is converging to the user-1 baseline at 402, or diverging, as well as provide an intuitive metric scaled between 0 and 1. That is, the following metrics may be given for patterns compared to that of learned patterns: intersection, fitness, type (converging or diverging patterns), and significance of matching. This detection methodology may combine forensic information as well as streaming information to detect interesting patterns consisting of sequences of events. Thus, the streaming detection measures anomalousness of an incoming, potentially incomplete, in-flight walk of events compared against the probability density distribution of all known master walks from the master directed graph 104 or learned model of behavior (e.g., the real-time activity graph for the user-1 at 400).

With respect to detection and enforcement, the apparatus 100 may implement a tiered approach where the first approach is to determine if an incoming event is anomalous with respect to all learned behaviors for a given model at a given time for a given granularity as disclosed herein with respect to FIGS. 1-3. Any incoming trace (i.e., from the data 118) deemed to be anomalous may then be tagged for further analysis and associated with all relevant information (e.g., agent originator, time, etc.). A second tier may then perform further analysis on a sequence of events to determine if an anomalous pattern or walk may be detected with respect to the probability distribution of all master walks within a known master graph model as disclosed herein with respect to FIG. 4.

With respect to visualization, a goal of visualization may include making the data 118 accessible to downstream applications by enabling users and applications to connect to the data infrastructure in universally acceptable ways and by ensuring that query results are delivered as quickly as required. To further enhance usability, the anomaly visualizer 124 may generate various types of visualizations 126 to facilitate an identification of anomalies in the data 118. The anomaly visualizer 124 may provide for an understanding of the underlying graph that models behaviors and provides true exploration and interaction through full text search and drill down capabilities. Models may be visually enhanced to have events both highlighted, for example, with color according to how anomalous with respect to previously traversed events, as well as sized according to how probable the particular events are with respect to all events.

Figure 5:
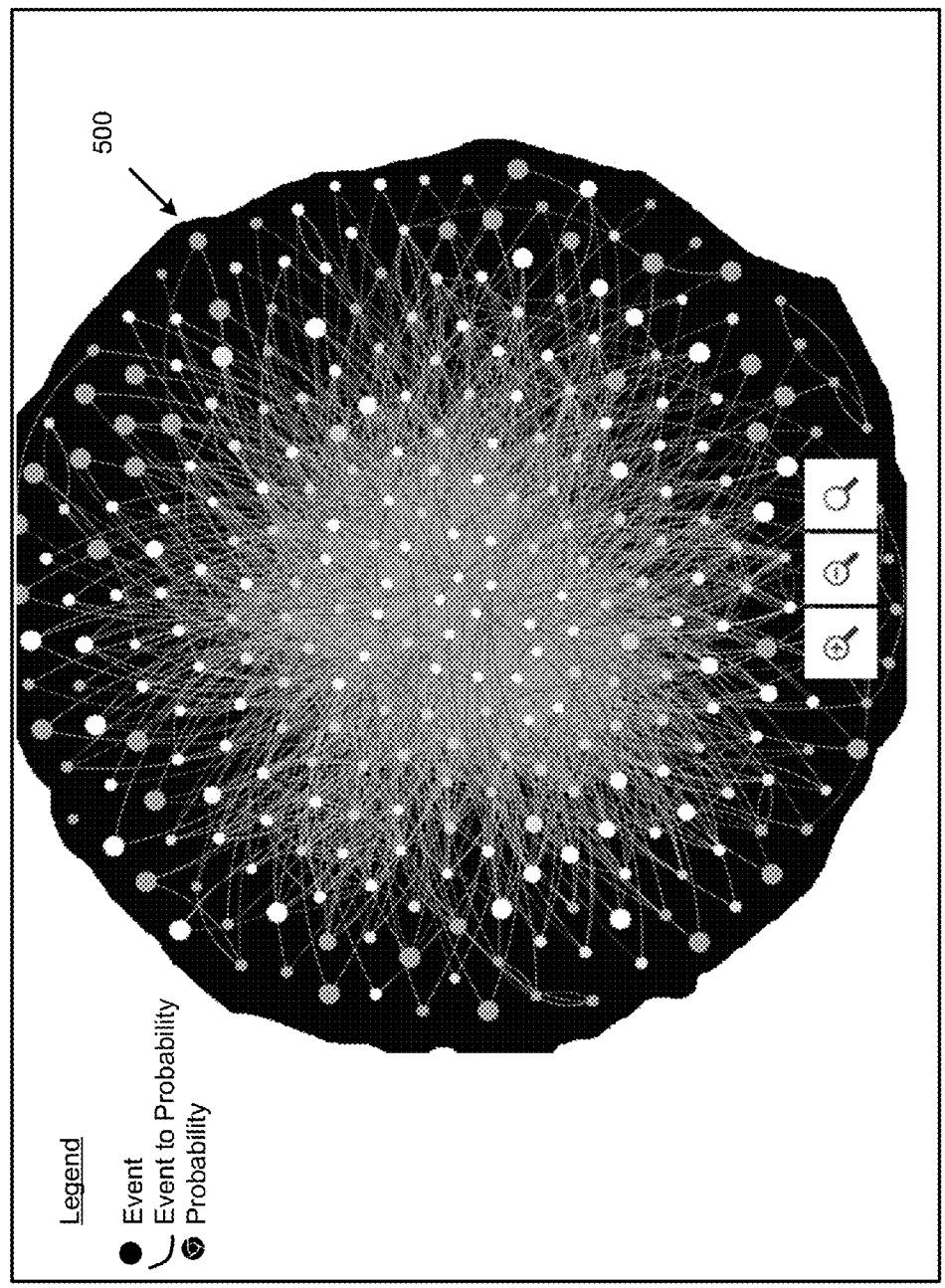
FIG. 5 illustrates a visualized graph model with events coded according to anomalousness of the events, and sized according to their global probabilities for the event anomaly analysis and prediction apparatus of FIG. 1, according to an example of the present disclosure.

For example, FIG. 5 illustrates a visualized graph model with events coded (e.g., color coded) according to how anomalous they are, and sized according to their global probabilities for the apparatus 100, according to an example of the present disclosure.

Referring to FIG. 5, with respect to the example of network security events disclosed herein, the apparatus 100 may be applied to three months (e.g., three petabyte) of security data to generate graphs with nodes representing the events, edges connecting events that are related to each other, the size representing the anomalousness (i.e., the very high probability of anomalousness events being displayed on the outer bounds as shown in FIG. 5 at 500, to the very-low probability of anomalousness events being displayed towards the middle), and different colors (e.g., red, yellow, orange, etc.) representing the probability of occurrence of the events. Further analysis may be performed by grouping events and providing mechanisms to navigate and visualize them according to their features.

Figure 6:
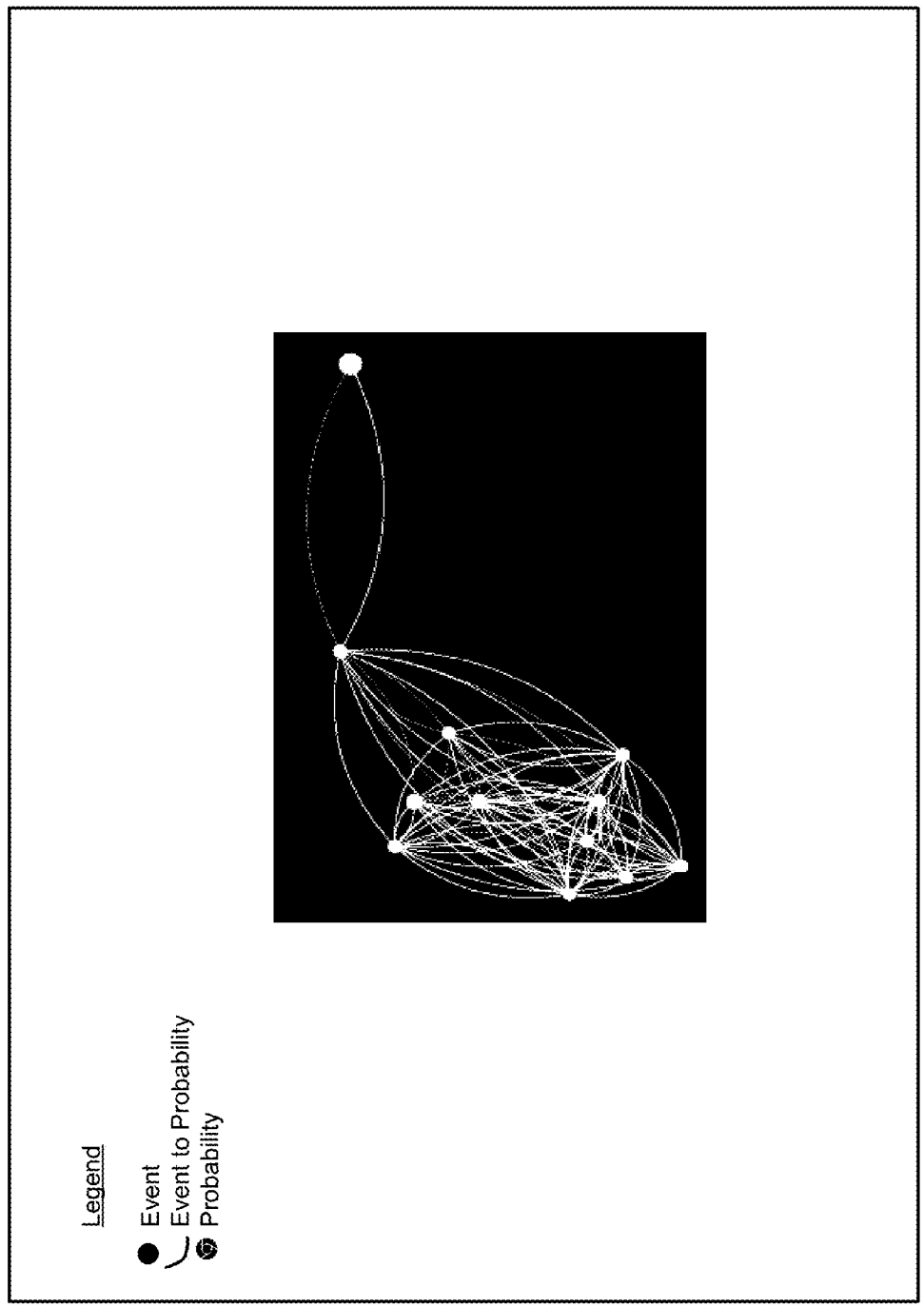
FIG. 6 illustrates a portion of a graph displayed according to a keyword search and drilled down for additional details for the event anomaly analysis and prediction apparatus of FIG. 1, according to an example of the present disclosure.

For example, FIG. 6 illustrates a portion of a graph displayed according to a keyword search and drilled down for additional details for the apparatus 100, according to an example of the present disclosure.

Referring to FIG. 6, the apparatus 100 may provide the capability for analysts to drill down into the learned models to explore preceding and succeeding events for any given event. Models may be aggregated, for example, for a given hour for a given day to create a graph model. For example, a particular event (i.e., node) of the display of FIG. 5 may be selected to generate the specific events related to the particular node as shown in FIG. 6.

The output of graph analysis may provide input into dashboards and exploratory visualizations. For example, ranked event anomalies may be stored and streaming events may also be compared against a stored set of the anomaly rankings. Any streamed event that falls within the highest anomaly category may be marked, aggregated, and cumulative event information may be streamed to an in-memory database from which polling will occur at a constant rate to update the visualization for quick display.

Figure 7:
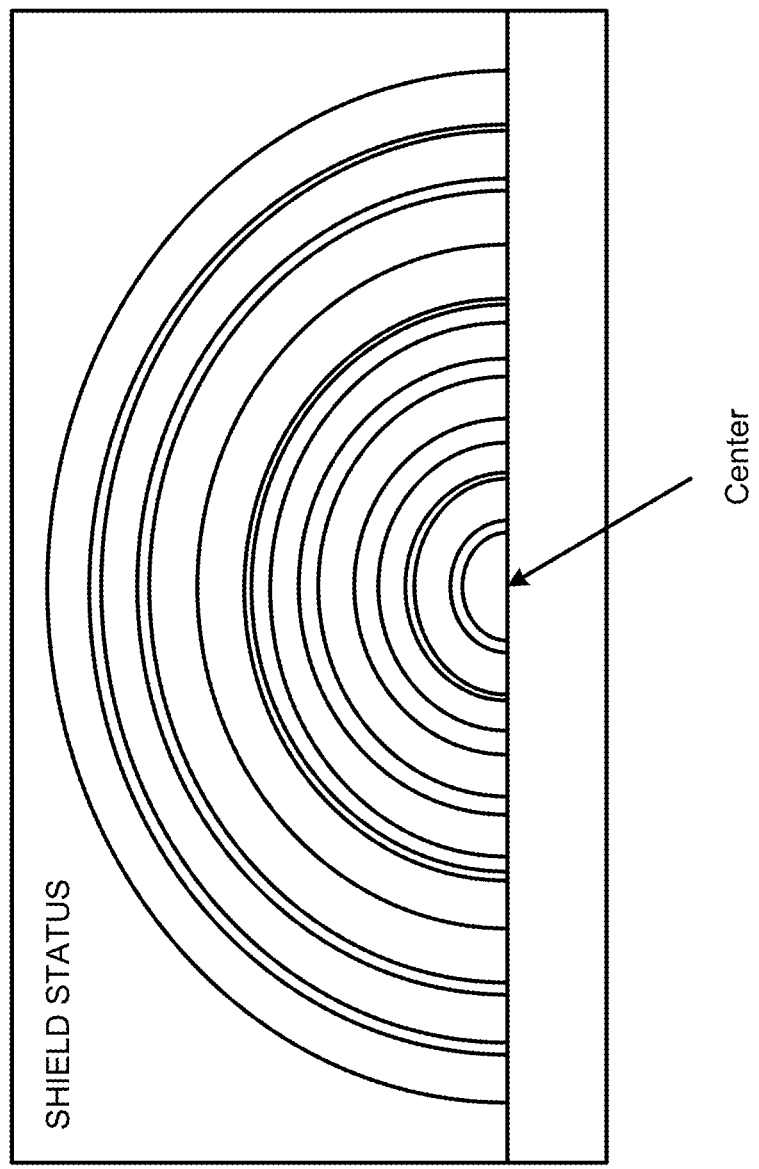
FIG. 7 illustrates a security shield visualization, defense in depth for activity of events at the firewall through to the operating system (OS) level for the event anomaly analysis and prediction apparatus of FIG. 1, according to an example of the present disclosure.

FIG. 7 illustrates a security shield visualization, defense in depth for activity of events at the firewall through to the OS level for the apparatus 100, according to an example of the present disclosure.

Figure 8:
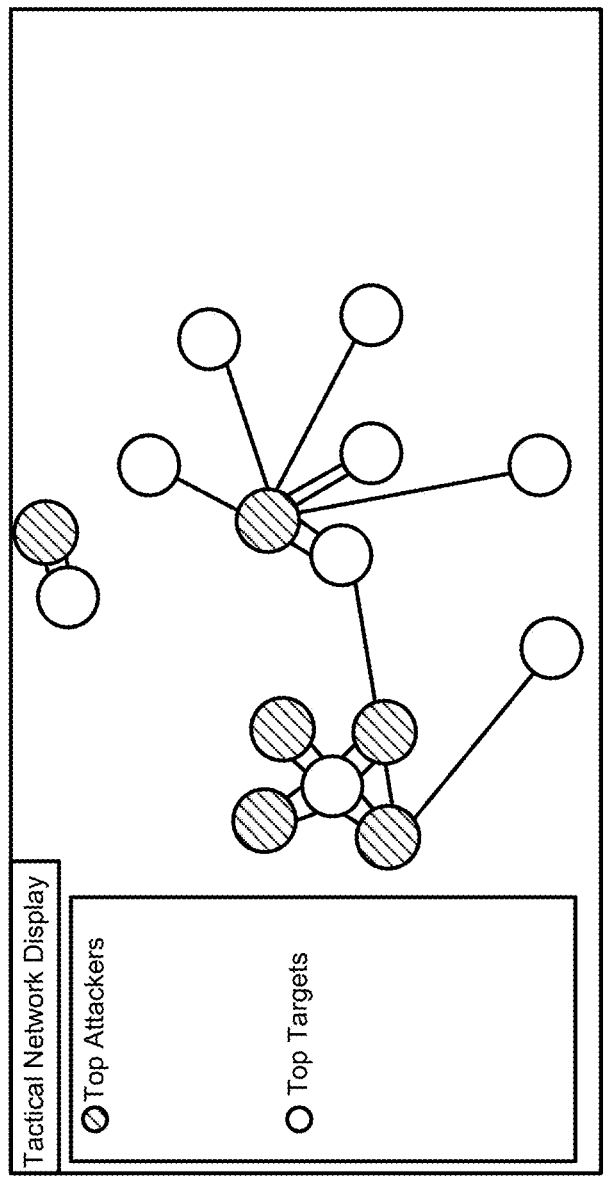
FIG. 8 illustrates an activity of traces marked as target and attacker with the top five most active anomalous targets/attackers shown for the event anomaly analysis and prediction apparatus of FIG. 1, according to an example of the present disclosure.

FIG. 8 illustrates an activity of traces marked as target and attacker with the top five most active anomalous target/attackers shown for the apparatus 100, according to an example of the present disclosure.

Referring to FIGS. 7 and 8, the displays of FIGS. 7 and 8 may provide situational awareness or defense in depth (e.g., show security event activity throughout the enterprise in several areas including: firewall, VPN, router, switch, intrusion detection systems, software management, application, and operating system levels).

Visualization may allow access to the data, and enable users and applications to connect to the data infrastructure in universally acceptable low latency ways.

Referring to FIG. 7, the streaming visualization of FIG. 7 provides board visibility into the most anomalous events compared to all events occurring in different security layers, while depicting defense in depth. Fluctuations in the shield may be identified to ascertain volume of events at different levels. Thus, the status of a security shield may be displayed at different levels from a center that includes events with very low probability of anomalousness to outer bounds that includes events with very high probability of anomalousness as shown in FIG. 7 (or vice versa).

Referring to FIG. 8, FIG. 8 may represent a visualization that enables visibility and exploration into the anomalous behaviors of systems on a network. FIG. 8 may represent force-directed graphs showing the attacker IPs and the target IPs. This may allow a user to explore the attack patterns and proactively identify outliers to prevent event escalation.

Figure 10:
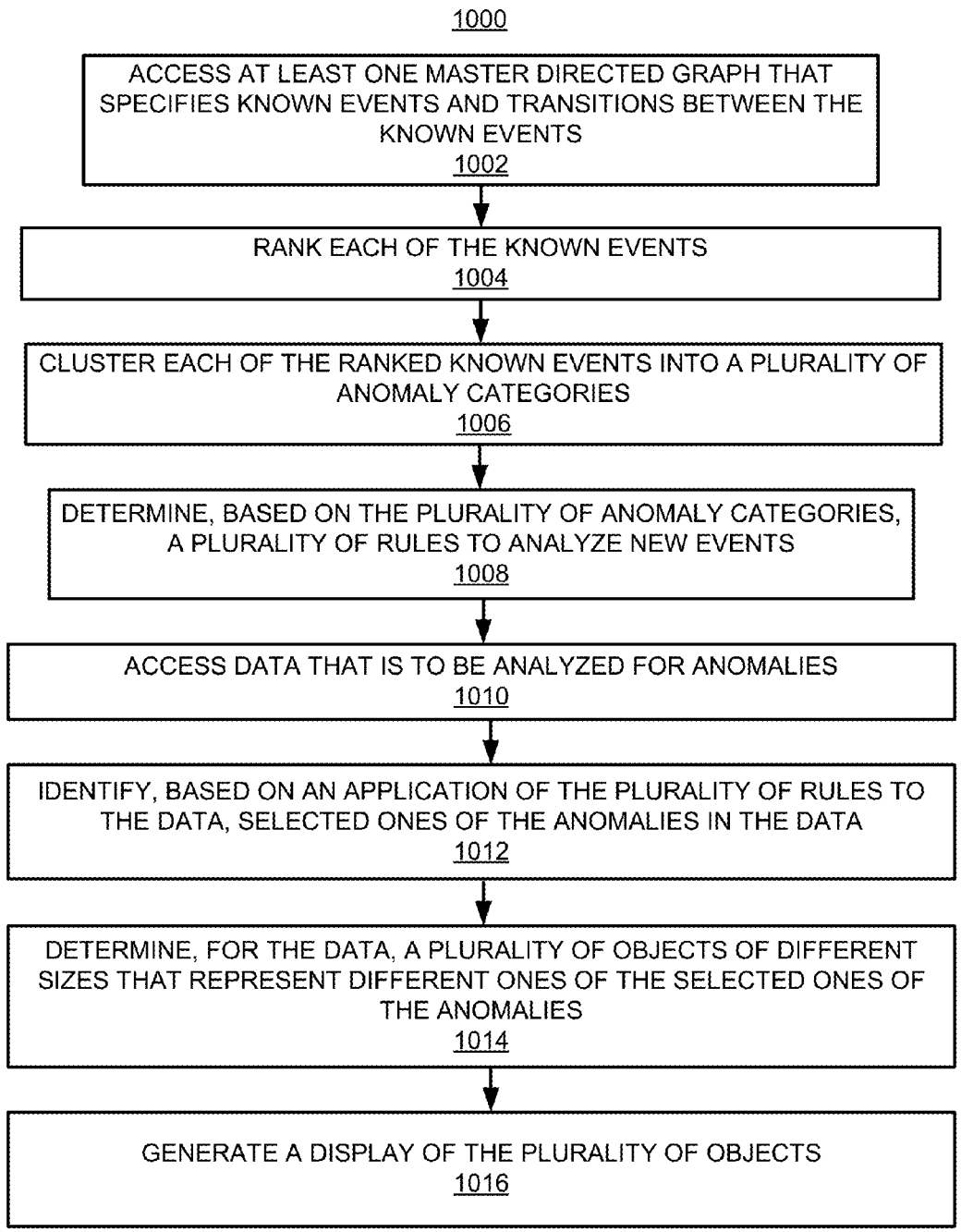
FIG. 10 illustrates a flowchart of another method for event anomaly analysis and prediction, according to an example of the present disclosure.
Figure 11:
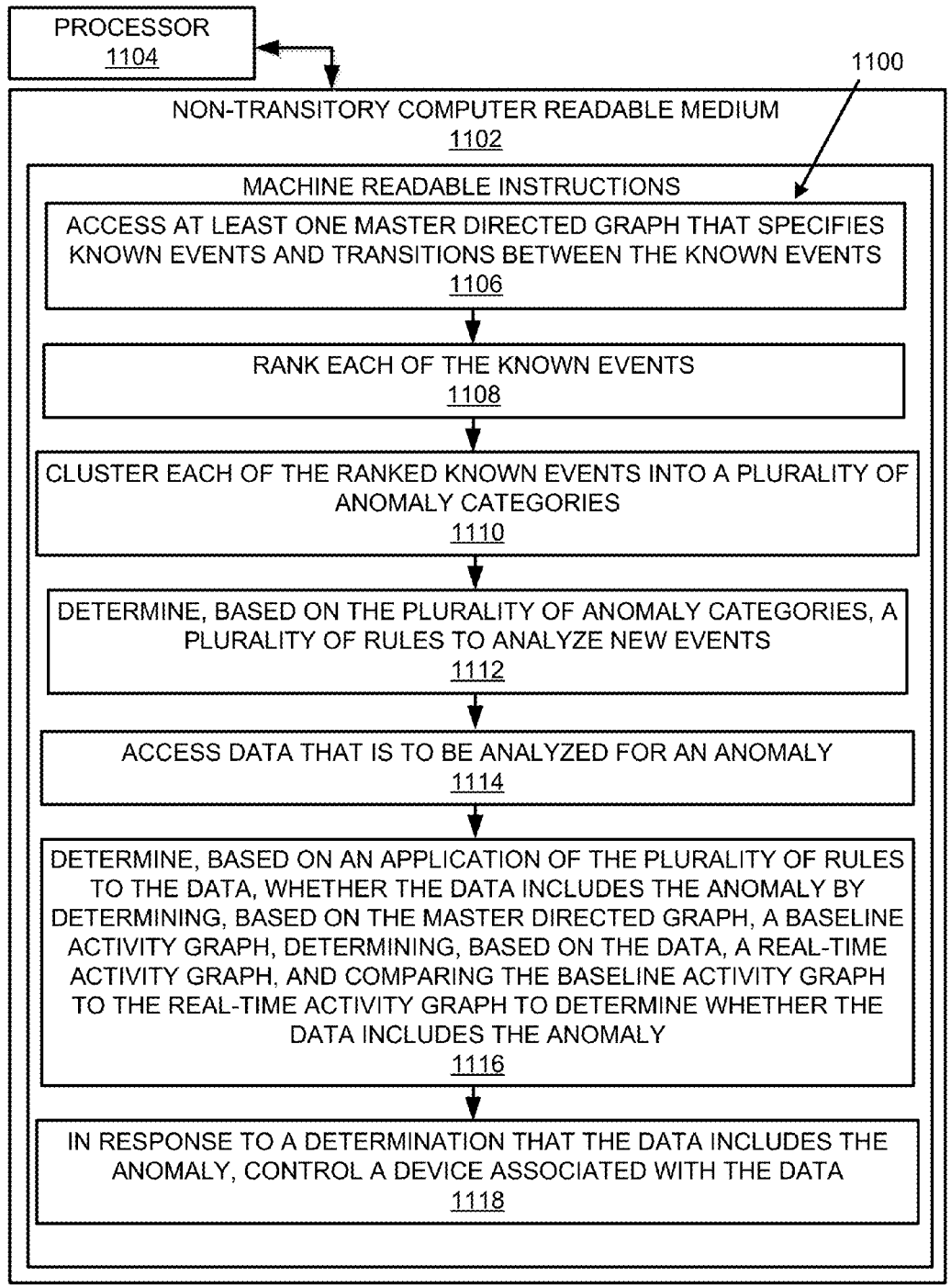
FIG. 11 illustrates a flowchart of a further method for event anomaly analysis and prediction, according to an example of the present disclosure.

FIGS. 9-11 respectively illustrate flowcharts of methods 900, 1000, and 1100 for event anomaly analysis and prediction, according to examples. The methods 900, 1000, and 1100 may be implemented on the apparatus 100 described above with reference to FIGS. 1-8 by way of example and not limitation. The methods 900, 1000, and 1100 may be practiced in other apparatus. In addition to showing the method 900, FIG. 9 shows hardware of the apparatus 100 that may execute the method 900. The hardware may include a processor 902, and a memory 904 storing machine readable instructions that when executed by the processor cause the processor to perform the steps of the method 900. The memory 904 may represent a non-transitory computer readable medium. FIG. 10 may represent a method for event anomaly analysis and prediction, and the steps of the method. FIG. 11 may represent a non-transitory computer readable medium 1102 having stored thereon machine readable instructions to provide event anomaly analysis and prediction. The machine readable instructions, when executed, cause a processor 1104 to perform steps of the method 1100 also shown in FIG. 11.

The processor 902 of FIG. 9 and/or the processor 1104 of FIG. 11 may include a single or multiple processors or other hardware processing circuit, to execute the methods, functions and other processes described herein. These methods, functions and other processes may be embodied as machine readable instructions stored on a computer readable medium, which may be non-transitory (e.g., the memory 904 of FIG. 9, and the non-transitory computer readable medium 1102 of FIG. 11), such as hardware storage devices (e.g., RAM (random access memory), ROM (read only memory), EPROM (erasable, programmable ROM), EEPROM (electrically erasable, programmable ROM), hard drives, and flash memory). The memory 904 may include a RAM, where the machine readable instructions and data for the processor 902 may reside during runtime.

Referring to FIGS. 1-9, and particularly to the method 900 shown in FIG. 9, at block 906, the method 900 may include accessing (e.g., by the master directed graph receiver 102)

the master directed graph 104 that specifies known events and transitions between the known events.

At block 908, the method 900 may include ranking (e.g., by the event ranker 106) each of the known events. The ranking of each of the known events may be based on a probability of anomalousness assigned to each of the known events, and the probability of anomalousness assigned to a known event of the known events may be determined relative to each of the other known events.

At block 910, the method 900 may include clustering (e.g., by the event cluster generator 108) each of the ranked known events into a plurality of anomaly categories 110.

At block 912, the method 900 may include determining (e.g., by the rules generator 112), based on the plurality of anomaly categories 110, a plurality of rules 114 to analyze new events.

At block 914, the method 900 may include accessing (e.g., by the data anomaly analyzer 116) data 118 that is to be analyzed for an anomaly.

At block 916, the method 900 may include determining (e.g., by the data anomaly analyzer 116), based on an application of the plurality of rules 114 to the data, whether the data 118 includes the anomaly.

At block 918, in response to a determination (e.g., by the data anomaly analyzer 116) that the data 118 includes the anomaly, the method 900 may include controlling (e.g., by the device controller 120) the device 122 associated with the data 118.

According to an example, for the method 900, ranking (e.g., by the event ranker 106) each of the known events may further include ranking each of the known events in an ascending order in accordance with the probability of anomalousness assigned to each of the known events.

According to an example, for the method 900, ranking (e.g., by the event ranker 106) each of the known events may further include identifying a most anomalous known event as an event with a lowest probability of occurrence associated with the ranking of each of the known events.

According to an example, for the method 900, clustering (e.g., by the event cluster generator 108) each of the ranked known events into the plurality of anomaly categories may further include clustering each of the ranked known events into the plurality of anomaly categories that include at least two of a very-high, a high, a medium, a low, and a very-low probability of being an anomaly.

According to an example, for the method 900, clustering (e.g., by the event cluster generator 108) each of the ranked known events into the plurality of anomaly categories may further include applying k-means clustering to cluster each of the ranked known events into the plurality of anomaly categories.

According to an example, for the method 900, as disclosed herein with reference to FIG. 4, determining, based on the application of the plurality of rules 114 to the data, whether the data includes the anomaly may further include determining (e.g., by the data anomaly analyzer 116), based on the master directed graph 104, a baseline activity graph, determining, based on the data 118, a real-time activity graph, and comparing the baseline activity graph to the real-time activity graph to determining whether the data 118 includes the anomaly.

According to an example, for the method 900, comparing (e.g., by the data anomaly analyzer 116) the baseline activity graph to the real-time activity graph to determining whether the data 118 includes the anomaly may further include determining if the real-time activity graph includes an event that is not present in the baseline activity graph.

According to an example, for the method 900, comparing (e.g., by the data anomaly analyzer 116) the baseline activity graph to the real-time activity graph to determining whether the data 118 includes the anomaly may further include determining if the real-time activity graph includes a transition between events that is not present in the baseline activity graph.

Referring to FIGS. 1-8 and 10, and particularly to the method 1000 shown in FIG. 10, at block 1002, the method 1000 may include accessing (e.g., by the master directed graph receiver 102) a master directed graph 104 that specifies known events and transitions between the known events.

At block 1004, the method 1000 may include ranking (e.g., by the event ranker 106) each of the known events. The ranking of each of the known events may be based on a probability of anomalousness assigned to each of the known events, and the probability of anomalousness assigned to a known event of the known events may be determined relative to each of the other known events.

At block 1006, the method 1000 may include clustering (e.g., by the event cluster generator 108) each of the ranked known events into a plurality of anomaly categories.

At block 1008, the method 1000 may include determining (e.g., by the rules generator 112), based on the plurality of anomaly categories, a plurality of rules 114 to analyze new events.

At block 1010, the method 1000 may include accessing (e.g., by the data anomaly analyzer 116) data 118 that is to be analyzed for anomalies.

At block 1012, the method 1000 may include identifying (e.g., by the data anomaly analyzer 116), based on an application of the plurality of rules 114 to the data 118, selected ones of the anomalies in the data 118.

At block 1014, the method 1000 may include determining (e.g., by the anomaly visualizer 124), for the data 118, a plurality of objects of different sizes that represent different ones of the selected ones of the anomalies.

At block 1016, the method 1000 may include generating (e.g., by the anomaly visualizer 124) a display (e.g., one of the visualizations 126) of the plurality of objects.

According to an example, the method 1000 may further include controlling (e.g., by the device controller 120), based on the identified selected ones of the anomalies in the data, the device 122 associated with the data.

According to an example, the method 1000 may further include filtering (e.g., by the master directed graph receiver 102) the master directed graph 104 by removing edges for which a number of times an event sequence has transitioned between nodes that are associated with the edges to be removed is less than a specified threshold. A node may represent a known event of the master directed graph 104, and an edge may represent a transition between associated known events.

Referring to FIGS. 1-8 and 11, and particularly to the method 1100 shown in FIG. 11, at block 1106, the method 1100 may include accessing (e.g., by the master directed graph receiver 102) the master directed graph 104 that specifies known events and transitions between the known events.

At block 1108, the method 1100 may include ranking (e.g., by the event ranker 106) each of the known events. The ranking of each of the known events may be based on a probability of anomalousness assigned to each of the known events. The probability of anomalousness assigned to a known event of the known events may be determined relative to each of the other known events.

At block 1110, the method 1100 may include clustering (e.g., by the event cluster generator 108) each of the ranked known events into a plurality of anomaly categories.

At block 1112, the method 1100 may include determining (e.g., by the rules generator 112), based on the plurality of anomaly categories, a plurality of rules 114 to analyze new events.

At block 1114, the method 1100 may include accessing (e.g., by the data anomaly analyzer 116) data 118 that is to be analyzed for an anomaly.

At block 1116, the method 1100 may include determining (e.g., by the data anomaly analyzer 116), based on an application of the plurality of rules 114 to the data 118, whether the data 118 includes the anomaly by determining, based on the master directed graph 104, a baseline activity graph, determining, based on the data, a real-time activity graph, and comparing the baseline activity graph to the real-time activity graph to determine whether the data includes the anomaly.

At block 1118, in response to a determination that the data includes the anomaly, the method 1100 may include controlling (e.g., by the device controller 120) the device 122 associated with the data 118.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. An event anomaly analysis and prediction apparatus comprising:
    a processor; and
    a memory storing machine readable instructions that when executed by the processor cause the processor to:
        access at least one master directed graph that specifies known events and transitions between the known events;
        rank each of the known events, wherein
            the ranking of each of the known events is based on a probability of anomalousness assigned to each of the known events, and
            the probability of anomalousness assigned to a known event of the known events is determined relative to each of the other known events;
        cluster each of the ranked known events into a plurality of anomaly categories;
        determine, based on the plurality of anomaly categories, a plurality of rules to analyze new events;
        access data that is to be analyzed for an anomaly;
        determine, based on an application of the plurality of rules to the data, whether the data includes the anomaly; and
        in response to a determination that the data includes the anomaly, control a device associated with the data.

2. The event anomaly analysis and prediction apparatus according to claim 1, wherein the machine readable instructions to rank each of the known events further comprise machine readable instructions to cause the processor to:
    rank each of the known events in an ascending order in accordance with the probability of anomalousness assigned to each of the known events.

3. The event anomaly analysis and prediction apparatus according to claim 2, wherein the machine readable instructions to rank each of the known events further comprise machine readable instructions to cause the processor to:
    identify a most anomalous known event as an event with a lowest probability of occurrence associated with the ranking of each of the known events.

4. The event anomaly analysis and prediction apparatus according to claim 1, wherein the machine readable instructions to cluster each of the ranked known events into the plurality of anomaly categories further comprise machine readable instructions to cause the processor to:
    cluster each of the ranked known events into the plurality of anomaly categories that include at least two of a very-high, a high, a medium, a low, and a very-low probability of being an anomaly.

5. The event anomaly analysis and prediction apparatus according to claim 1, wherein the machine readable instructions to cluster each of the ranked known events into the plurality of anomaly categories further comprise machine readable instructions to cause the processor to:
    apply k-means clustering to cluster each of the ranked known events into the plurality of anomaly categories.

6. The event anomaly analysis and prediction apparatus according to claim 1, wherein the machine readable instructions to determine, based on the application of the plurality of rules to the data, whether the data includes the anomaly further comprise machine readable instructions to cause the processor to:
    determine, based on the master directed graph, a baseline activity graph;
    determine, based on the data, a real-time activity graph; and
    compare the baseline activity graph to the real-time activity graph to determine whether the data includes the anomaly.

7. The event anomaly analysis and prediction apparatus according to claim 6, wherein the machine readable instructions to compare the baseline activity graph to the real-time activity graph to determine whether the data includes the anomaly further comprise machine readable instructions to cause the processor to:
    determine if the real-time activity graph includes an event that is not present in the baseline activity graph.

8. The event anomaly analysis and prediction apparatus according to claim 6, wherein the machine readable instructions to compare the baseline activity graph to the real-time activity graph to determine whether the data includes the anomaly further comprise machine readable instructions to cause the processor to:
    determine if the real-time activity graph includes a transition between events that is not present in the baseline activity graph.

9. A method for event anomaly analysis and prediction, the method comprising:
    accessing at least one master directed graph that specifies known events and transitions between the known events;
    ranking each of the known events, wherein
        the ranking of each of the known events is based on a probability of anomalousness assigned to each of the known events, and
        the probability of anomalousness assigned to a known event of the known events is determined relative to each of the other known events;
    clustering each of the ranked known events into a plurality of anomaly categories;
    determining, based on the plurality of anomaly categories, a plurality of rules to analyze new events;

accessing data that is to be analyzed for anomalies;

identifying, based on an application of the plurality of rules to the data, selected ones of the anomalies in the data;

determining, for the data, a plurality of objects of different sizes that represent different ones of the selected ones of the anomalies; and generating a display of the plurality of objects.

10. The method according to claim 9, further comprising:
controlling, based on the identified selected ones of the anomalies in the data, a device associated with the data.

11. The method according to claim 9, further comprising:
filtering the master directed graph by removing edges for which a number of times an event sequence has transitioned between nodes that are associated with the edges to be removed is less than a specified threshold, wherein a node represents a known event of the master directed graph, and an edge represents a transition between associated known events.

12. The method according to claim 9, wherein ranking each of the known events further comprises:
ranking each of the known events in an ascending order in accordance with the probability of anomalousness assigned to each of the known events.

13. The method according to claim 12, wherein ranking each of the known events further comprises:
identifying a most anomalous known event as an event with a lowest probability of occurrence associated with the ranking of each of the known events.

14. The method according to claim 9, wherein clustering each of the ranked known events into the plurality of anomaly categories further comprises:
clustering, by applying k-means clustering, each of the ranked known events into the plurality of anomaly categories that include at least two of a very-high, a high, a medium, a low, and a very-low probability of being an anomaly.

15. A non-transitory computer readable medium having stored thereon machine readable instructions for event anomaly analysis and prediction, the machine readable instructions, when executed, cause a processor to:
access at least one master directed graph that specifies known events and transitions between the known events;
rank each of the known events, wherein
the ranking of each of the known events is based on a probability of anomalousness assigned to each of the known events, and
the probability of anomalousness assigned to a known event of the known events is determined relative to each of the other known events;
cluster each of the ranked known events into a plurality of anomaly categories;
determine, based on the plurality of anomaly categories, a plurality of rules to analyze new events;
access data that is to be analyzed for an anomaly;
determine, based on an application of the plurality of rules to the data, whether the data includes the anomaly by
determining, based on the master directed graph, a baseline activity graph,
determining, based on the data, a real-time activity graph, and
comparing the baseline activity graph to the real-time activity graph to determine whether the data includes the anomaly; and
in response to a determination that the data includes the anomaly, control a device associated with the data.

16. The non-transitory computer readable medium of claim 15, wherein the machine readable instructions to rank each of the known events, when executed, further cause the processor to:
rank each of the known events in an ascending order in accordance with the probability of anomalousness assigned to each of the known events.

17. The non-transitory computer readable medium of claim 16, wherein the machine readable instructions to rank each of the known events, when executed, further cause the processor to:
identify a most anomalous known event as an event with a lowest probability of occurrence associated with the ranking of each of the known events.

18. The non-transitory computer readable medium of claim 15, wherein the machine readable instructions to compare the baseline activity graph to the real-time activity graph to determine whether the data includes the anomaly, when executed, further cause the processor to:
determine if the real-time activity graph includes an event that is not present in the baseline activity graph.

19. The non-transitory computer readable medium of claim 15, wherein the machine readable instructions to compare the baseline activity graph to the real-time activity graph to determine whether the data includes the anomaly, when executed, further cause the processor to:
determine if the real-time activity graph includes a transition between events that is not present in the baseline activity graph.

20. The non-transitory computer readable medium of claim 15, further comprising machine readable instructions, when executed, further cause the processor to:
filter the master directed graph by removing edges for which a number of times an event sequence has transitioned between nodes that are associated with the edges to be removed is less than a specified threshold, wherein a node represents a known event of the master directed graph, and an edge represents a transition between associated known events.

* * * * *